United States Patent
Shin et al.

(10) Patent No.: US 11,176,856 B2
(45) Date of Patent: Nov. 16, 2021

(54) DISPLAY DEVICE AND METHOD FOR INSPECTING SIGNAL LINES OF THE SAME

(71) Applicant: Samsung Display Co., Ltd., Yongin-Si (KR)

(72) Inventors: Donghee Shin, Asan-si (KR); Hyungjin Song, Hwaseong-si (KR); Byoungsun Na, Seoul (KR); Yoomi Ra, Ansan-si (KR); Soohong Cheon, Seoul (KR)

(73) Assignee: Samsung Display Co., Ltd.

( * ) Notice: Subject to any disclaimer, the term of this patent is extended or adjusted under 35 U.S.C. 154(b) by 243 days.

(21) Appl. No.: 16/274,157

(22) Filed: Feb. 12, 2019

(65) Prior Publication Data

US 2019/0279544 A1 Sep. 12, 2019

(30) Foreign Application Priority Data

Mar. 12, 2018 (KR) .......................... 10-2018-0028461

(51) Int. Cl.
  *G09G 3/00* (2006.01)
  *G09G 3/36* (2006.01)
  (Continued)

(52) U.S. Cl.
  CPC .......... *G09G 3/006* (2013.01); *G02F 1/1368* (2013.01); *G02F 1/136209* (2013.01); *G02F 1/136259* (2013.01); *G02F 1/136286* (2013.01); *G09G 3/3688* (2013.01); *G02F 2001/136254* (2013.01); *G02F 2001/136263* (2013.01); *G02F 2201/123* (2013.01); *G09G 2300/0426* (2013.01); *G09G 2300/0452* (2013.01); *G09G 2300/0465* (2013.01)

(58) Field of Classification Search
  CPC .......... G01R 19/16519; G01R 31/2621; G09G 3/3241; G09G 3/325
  See application file for complete search history.

(56) References Cited

U.S. PATENT DOCUMENTS 7,535,522 B2 5/2009 Watanabe et al.
9,772,523 B2 9/2017 Lim
(Continued)

FOREIGN PATENT DOCUMENTS

KR 10-0689727 B1 3/2007
KR 10-2016-0124981 A 10/2016

*Primary Examiner* — Tung X Nguyen
(74) *Attorney, Agent, or Firm* — Innovation Counsel LLP

(57) ABSTRACT

A display device and a method of inspecting signal lines of the display device facilitating inspection of a large number of signal lines are disclosed. According to one embodiment, the display device includes: a substrate; a first signal line disposed in a display area of the substrate; and a first inspection line disposed in a non-display area of the substrate and connected to the first signal line. The first inspection line includes: a first line connected to the first signal line; a second line disposed on a layer substantially the same as a layer on which the first line is disposed, the second line spaced apart from the first line; and a third line disposed on a layer different from the layer on which the first line and the second line are disposed with an insulating layer interposed therebetween, the third line overlapping at least a portion of the first line and a portion of the second line.

27 Claims, 29 Drawing Sheets

(51) Int. Cl.
*G02F 1/1368* (2006.01)
*G02F 1/1362* (2006.01)

(56) References Cited

U.S. PATENT DOCUMENTS

| | | | | |
|---|---|---|---|---|
| 2014/0346475 | A1* | 11/2014 | Cho | H01L 27/326 |
| | | | | 257/40 |
| 2015/0015820 | A1* | 1/2015 | Masutani | G02F 1/136286 |
| | | | | 349/42 |
| 2017/0069239 | A1* | 3/2017 | Kwon | H01L 27/124 |
| 2019/0088584 | A1* | 3/2019 | Won | H01L 27/124 |
| 2019/0310509 | A1* | 10/2019 | Shin | H01L 27/1255 |

\* cited by examiner

DISPLAY DEVICE AND METHOD FOR INSPECTING SIGNAL LINES OF THE SAME

CROSS-REFERENCE TO RELATED APPLICATION

This application claims priority under 35 U.S.C. § 119 to Korean Patent Application No. 10-2018-0028461, filed on Mar. 12, 2018, in the Korean Intellectual Property Office (KIPO), the disclosure of which is incorporated by reference herein in its entirety.

TECHNICAL FIELD

Embodiments of the present disclosure relate to a display device, and more particularly, to a display device capable of easily inspecting a large number of signal lines and a method of inspecting the large number of signal lines of the display device.

DISCUSSION OF RELATED ART

A display device includes a plurality of gate lines and a plurality of data lines.

During a manufacturing process of the display device, inspection of defects such as short-circuit or disconnection of the data lines is performed.

A high-resolution display device, particularly ones with a large surface area, includes a large number of data lines, and thus intervals between adjacent data lines should be considerably narrowed. This also narrows the intervals of inspection lines connected to ends of these data lines. In addition, the intervals of the inspection lines are kept narrower than the intervals of the data lines to reduce an inspection time.

The interval between adjacent inspection lines should be at least wider than a width of output terminals of an inspection equipment that contacts these inspection lines, so that the output terminal of the inspection equipment does not contact adjacent inspection lines at the same time. However, since the high-resolution display device described above includes a considerably large number of data lines, the interval of the inspection lines connected to these data lines may become narrower than the width of the inspection equipment. In such a case, defect inspection on the data lines may provide inaccurate results.

It is to be understood that this background of the present disclosure is intended to provide useful background for understanding the technology and as such disclosed herein, the background may include ideas, concepts, or recognitions that are not a part of what are known or appreciated by those skilled in the pertinent art prior to a corresponding effective filing date of the subject matter disclosed herein.

SUMMARY

Embodiments of the present disclosure is directed to a display device capable of easily inspecting a large number of signal lines and a method of inspecting the large number of signal lines of the display device.

According to an embodiment, a display device includes: a substrate; a first signal line disposed in a display area of the substrate; and a first inspection line disposed in a non-display area of the substrate and connected to the first signal line. The first inspection line includes: a first line connected to the first signal line; a second line disposed on a layer substantially the same as a layer on which the first line is disposed, the second line spaced apart from the first line; and a third line disposed on a layer different from the layer on which the first line and the second line are disposed with an insulating layer interposed therebetween, the third line overlapping at least a portion of the first line and a portion of the second line.

One side edge of the substrate may face an end of the second line.

The third line may be connected to the first line through a first contact hole of the insulating layer.

The third line may be connected to the second line through a second contact hole of the insulating layer.

The third line may be surrounded by the insulating layer.

The third line may include: a first pad portion overlapping the first line; a second pad portion overlapping the second line; and a line portion disposed between the first pad portion and the second pad portion without overlapping the first line and the second line.

Each of the first pad portion and the second pad portion may have a width larger than a width of the line portion of the third line.

The first line may include: a line portion connected to the first signal line; and a pad portion connected to the line portion of the first line and overlapping at least a portion of the third line.

The pad portion of the first line may have a width larger than a width of the line portion of the first line.

The second line may include: a pad portion facing the pad portion of the first line and overlapping at least a portion of the third line; and a line portion connected to the pad portion of the second line.

The pad portion of the second line may have a width larger than a width of the line portion of the second line.

The display device may further include: a second signal line disposed in the display area adjacently to the first signal line; and a second inspection line connected to the second signal line and disposed in the non-display area adjacently to the first inspection line.

One side edge of the substrate may face an end of the second line and an end of the second inspection line, and a first distance between the end of the second line and the one side edge may be different from a second distance between the end of the second inspection line and the one side edge.

The second distance may be longer than the first distance.

According to an embodiment, a display device includes: a substrate including a display area in which pixels are disposed, a non-display area disposed adjacent to the display area, and first to n-th inspection areas (n being a natural number larger than 1) arranged in the non-display area along a first direction; and first to n-th inspection lines disposed in the non-display area and extending along a second direction intersecting the first direction, the first to n-th inspection lines connected to first to n-th signal lines of the display area, respectively. The first inspection line extends toward an edge of the substrate and overlaps the first to n-th inspection areas, a p-th inspection line (p being a natural number larger than 1 and less than or equal to n) extends toward the edge of the substrate and overlaps the first to (n−p+1)-th inspection areas, and two inspection lines among the first to n-th inspection lines that are adjacent to each other in a q-th inspection area (q being a natural number less than n) are disposed on different layers from each other with respect to an insulating layer interposed therebetween.

An (n−q)-th inspection line and an (n−q+1)-th inspection line in the q-th inspection area may be disposed on different layers from each other with respect to the insulating layer.

The first to (n−q)-th inspection lines in the q-th inspection area may be disposed on a substantially same layer with respect to the insulating layer.

The q-th inspection area may include an area between a lowermost pad portion of the (n−q+1)-th inspection line and a lowermost pad portion of the (n−q)-th inspection line.

The q-th inspection area may include an area between two imaginary parallel lines that pass through facing surfaces of a lowermost pad portion of the (n−q+1)-th inspection line and a lowermost pad portion of the (n−q)-th inspection line, respectively.

The n-th inspection area may include an area between a lowermost pad portion of the first inspection line and the edge of the substrate.

Distances between the edge of the substrate and respective first to n-th ends of the first to n-th inspection lines may be different from each other.

A distance between the edge of the substrate and an end of the p-th inspection line may be longer than a distance between the edge of the substrate and an end of the (p−1)-th inspection line The first inspection line may include: a first line disposed on a layer substantially the same as a layer on which the n-th inspection line is disposed, the first line connected to the first signal line; a second line disposed on a layer substantially the same as the layer on which the n-th inspection line is disposed, the second line spaced apart from the first line; and a third line disposed on a layer different from the layer on which the n-th inspection line is disposed with an insulating layer interposed therebetween, the third line overlapping at least a portion of the first line and a portion of the second line.

The third line may include: a first pad portion overlapping the first line; a second pad portion overlapping the second line; and a line portion disposed between the first pad portion and the second pad portion without overlapping the first line and the second line.

According to an embodiment, a method of inspecting signal lines of a display device includes: preparing the display device including: a substrate including a display area in which pixels are disposed, a non-display area disposed adjacent to the display area, and first to n-th inspection areas (n being a natural number larger than 1) arranged in the non-display area and extending along a first direction; and first to n-th inspection lines disposed in the non-display area and extending along a second direction intersecting the first direction, the first to n-th inspection lines connected to first to n-th signal lines of the display area, respectively. The first inspection line extends toward an edge of the substrate and overlapping the first to n-th inspection areas, a p-th inspection line (p being a natural number larger than 1 and less than or equal to n) extends toward the edge of the substrate and overlaps the first to (n−p+1)-th inspection areas, and two inspection lines among the first to n-th inspection lines that are adjacent to each other in a q-th inspection area (q being a natural number less than n) are disposed on different layers from each other with respect to an insulating layer interposed therebetween. The method further includes: sequentially applying inspection signals to exposed inspection lines in the q-th inspection area; and sequentially applying inspection signals to exposed inspection lines in a (q+1)-th inspection area.

Sequentially applying the inspection signals to the exposed inspection lines in the q-th inspection area may include: disposing an inspection equipment for providing the inspection signal in the q-th inspection area; and moving the inspection equipment along the second direction allowing an output terminal of the inspection equipment to sequentially contact the exposed inspection lines in the q-th inspection area.

Sequentially applying the inspection signals to the exposed inspection lines in the (q+1)-th inspection area may include: disposing an inspection equipment for providing the inspection signal in the (q+1)-th inspection area; and moving the inspection equipment along the second direction allowing the output terminal of the inspection equipment to sequentially contact the exposed inspection lines in the (q+1)-th inspection area.

The foregoing is illustrative only and is not intended to be in any way limiting. In addition to the illustrative aspects, embodiments and features described above, further aspects, embodiments and features will become apparent by reference to the drawings and the following detailed description.

BRIEF DESCRIPTION OF THE DRAWINGS

A more complete appreciation of the present disclosure will become more apparent by describing in detail embodiments thereof with reference to the accompanying drawings, wherein.

DETAILED DESCRIPTION

Figure 1:
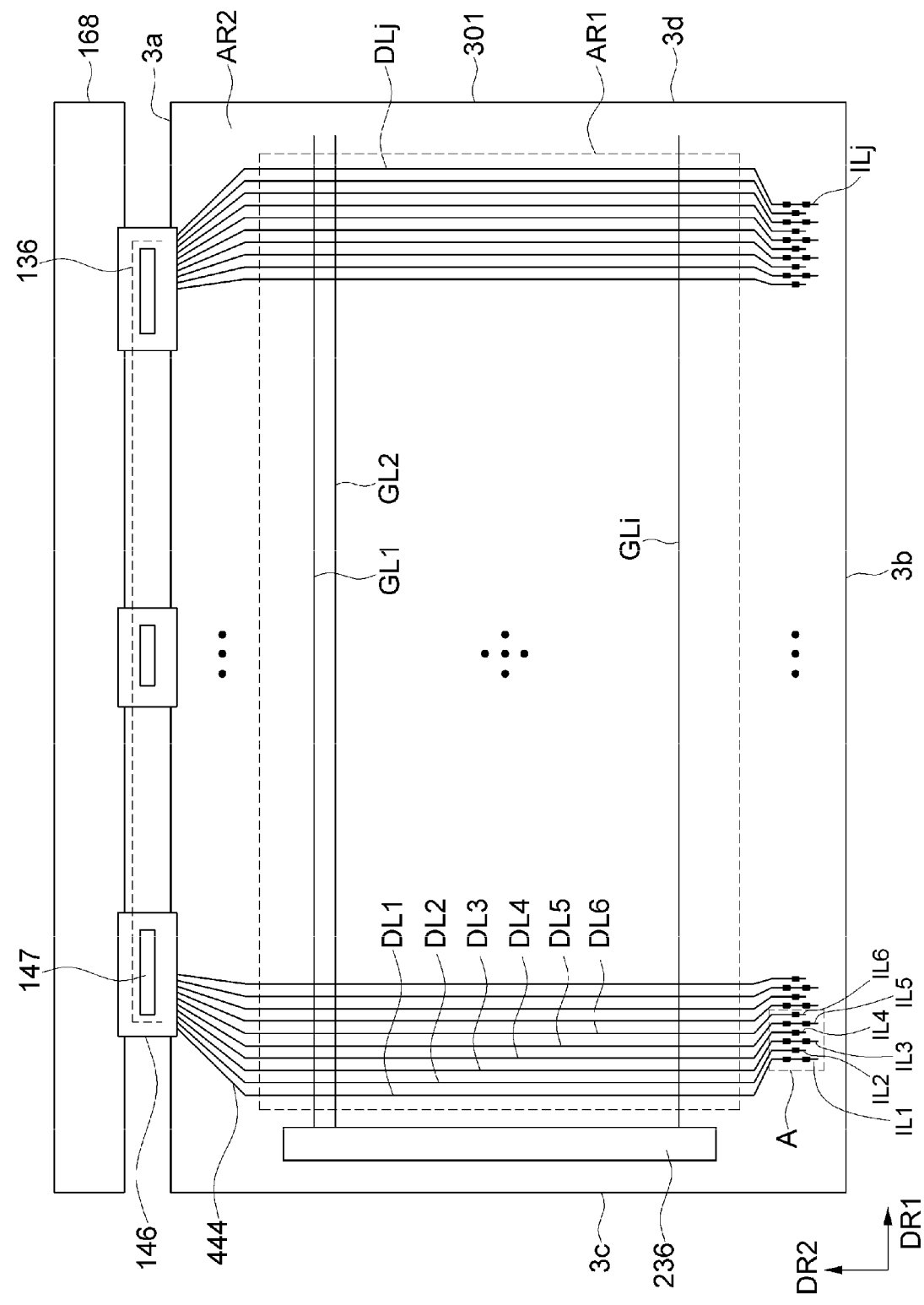
FIG. 1 is a plan view illustrating a display device according to an embodiment of the present disclosure.

Embodiments will now be described more fully hereinafter with reference to the accompanying drawings. Although the present disclosure may be modified in various manners and have several embodiments, embodiments that are illustrated in the accompanying drawings will be mainly described in the specification. However, the scope of the present disclosure is not limited to the embodiments and should be construed as including all the changes, equivalents, and substitutions included in the spirit and scope of the present disclosure.

In the drawings, thicknesses of a plurality of layers and areas are illustrated in an enlarged manner for clarity and ease of description thereof. When a layer, area, or, plate is referred to as being "on" another layer, area, or plate, it may be directly on the other layer, area, or plate, or one or more intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or one or more intervening layers, areas, or plates may be present therebetween. Conversely, when a layer, area, or plate is referred to as being "directly below" another layer, area, or plate, intervening layers, areas, or plates may be absent therebetween.

The spatially relative terms "below," "beneath," "lower," "above," "upper," or the like, may be used herein for ease of description to describe the spatial relations between one element or component and another element or component as illustrated in the drawings. It will be understood that the spatially relative terms are intended to encompass different orientations of the device in use or operation, in addition to the orientation depicted in the drawings. For example, in a case where a device illustrated in the drawing is turned over, the device positioned "below" or "beneath" another device may be placed "above" another device. Accordingly, the illustrative term "below" may include both the lower and upper positions. The device may also be oriented in another direction and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "including," "includes," and/or "including," when used in this specification, specify the presence of stated features, integers, steps, operations, elements, and/or constituent elements, but do not preclude the presence or addition of one or more other features, integers, steps, operations, elements, constituent elements, and/or groups thereof.

It will be understood that, although the terms "first," "second," "third," or the like may be used herein to describe various elements, these elements should not be limited by these terms. Instead, these terms are only used to distinguish one element from another element. Thus, "a first element" could be termed "a second element" or "a third element," and "a second element" and "a third element" may be termed likewise without departing from the teachings herein.

"About" or "approximately" as used herein is inclusive of a stated value and means within an acceptable range of variation for the particular value as determined by one of ordinary skill in the art, considering measurement in question and an error associated with measurement of the particular quantity (i.e., limitations of the measurement system). For example, "about" may mean within one or more standard variations, or within ±30%, 20%, 10%, 5% of a stated value.

Unless otherwise defined, all terms used herein (including technical and scientific terms) have the same meaning as commonly understood by those skilled in the art to which the present disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts that are not associated with the description may not be provided in order to specifically describe embodiments of the present disclosure, and like reference numerals refer to like elements throughout the specification.

Hereinafter, a display device and a method of inspecting signal lines of the display device will be described in detail with reference to FIGS. 1 to 30.

Figure 2:
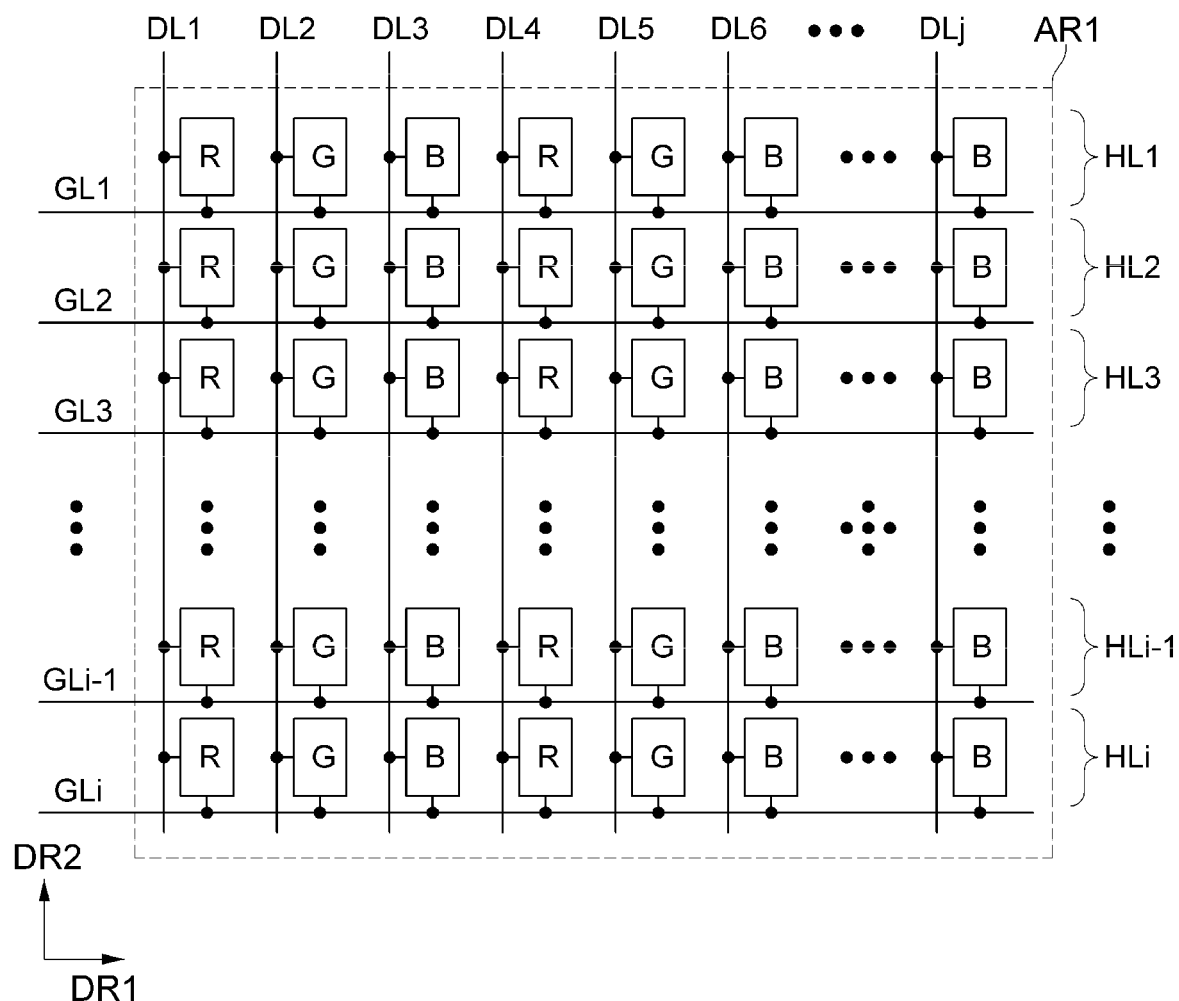
FIG. 2 is a view illustrating a part of a display area of FIG. 1.

FIG. 1 is a plan view illustrating a display device according to an embodiment of the present disclosure, and FIG. 2 is a view illustrating a part of a display area of FIG. 1.

As illustrated in FIG. 1, the display device according to an embodiment of the present disclosure includes a substrate 301, a plurality of gate lines GL1 to GLi, a plurality of data lines DL1 to DLj, a gate driver 236, a data driver 136, and a circuit board 168.

As illustrated in FIGS. 1 and 2, the gate lines GL1 to GLi and the data lines DL1 to DLj are positioned in a display area AR1 of the substrate 301. The data lines DL1 to DLj intersect the gate lines GL1 to GLi .

The gate lines GL1 to GLi disposed in the display area AR1 extend to a non-display area AR2 and are connected to the gate driver 236.

The gate driver 236 is disposed in the non-display area AR2 of the substrate 301. The gate driver 236 generates gate signals and sequentially applies the gate signals to the plurality of gate lines GL1 to GLi.

The data lines DL1 to DLj disposed in the display area AR1 extend to the non-display area AR2 and are connected to the data driver 136. For example, the data lines DL1 to DLj are connected to corresponding ones of output terminals of the data driver 136 via fan-out lines 444 that are positioned in the non-display area AR2 of the substrate 301.

The data driver 136 includes a plurality of data driving integrated circuits ("ICs") 147. The data driving ICs 147 receive digital image data signals and a data control signal from a timing controller (not illustrated).

The data driving ICs 147 sample the digital image data signals according to the data control signal, latch the sampled image data signals corresponding to one horizontal line in each horizontal period, and apply the latched image data signals to the data lines DL1 to DLj. For example, the data driving ICs 147 convert the digital image data signals received from the timing controller to analog image signals using a gamma voltage input from a power supplier (not illustrated), and applies the analog image data signals to the data lines DL1 to DLj.

The data driving ICs 147 are mounted on corresponding one of data carriers 146. The data carriers 146 are connected between the circuit board 168 and the substrate 301. For example, each of the data carriers 146 may be electrically connected between the circuit board 168 and the non-display area AR2 of the substrate 301.

The timing controller and the power supplier described above may be positioned on the circuit board 168. The data carrier 146 includes input lines for transmitting various signals from the timing controller and the power supplier to the data drive ICs 147, and output lines for transmitting the image data signals output from the data driving ICs 147 to corresponding ones of the data lines DL1 to DLj. In an embodiment, at least one carrier 146 may further include auxiliary lines (not illustrated) for transmitting various signals from the timing controller and the power supplier to the gate driver 236. The auxiliary lines are connected to connection lines positioned at the substrate 301. The connection lines connect the auxiliary lines and the gate driver 236 to each other. The connection lines may be formed on the non-display area AR2 of the substrate 301 in a line-on-glass manner As illustrated in FIG. 2, a plurality of pixels R, G, and B are disposed in the display area AR1 of the substrate 301.

The pixels R, G, and B are arranged in a matrix form. The pixels R, G, and B include a red pixel R for displaying a red image, a green pixel G for displaying a green image, and a blue pixel B for displaying a blue image. In such an embodiment, the red pixel R, the green pixel G, and the blue pixel B arranged to be adjacent to each other in a horizontal direction may form a unit pixel for displaying one unit image.

In an exemplary embodiment, j number of pixels (hereinafter, n-th horizontal line pixels) arranged along an n-th (n being a natural number selected from 1 to i) horizontal line are individually connected to the first to j-th data lines DL1 to DLj, respectively. In addition, the n-th horizontal line pixels are connected in common to an n-th gate line. Accordingly, the n-th horizontal line pixels receive an n-th gate signal as a common signal. That is, all of the j number of pixels in a same horizontal line receive a same gate signal, while pixels in different horizontal lines receive different gate signals, respectively. For example, the red pixel R, the green pixel G, and the blue pixel B in a first horizontal line HL1 receive a first gate signal GL1, while the red pixel R, the green pixel G, and the blue pixel B in a second horizontal line HL2 receive a second gate signal GL2 that has an output timing that is different from an output timing of the first gate signal GL1.

Referring to FIG. 1, the data lines DL1 to DLj are connected to corresponding ones of inspection lines IL1 to ILj. For example, the first to j-th data lines DL1 to DLj may be connected to first to j-th inspection lines IL1 to ILj, respectively.

The inspection lines IL1 to ILj are disposed in the non-display area AR2 of the substrate 301. In the present example, the substrate 301 has four edges 3a, 3b, 3c and 3d, Among the four edges 3a, 3b, 3c, and 3d, an edge overlapping the data driver 136 is defined as an upper edge 3a of the substrate 301, and an edge opposing the upper edge 3a is defined as a lower edge 3b of the substrate 301. The inspection lines IL1 to ILj are disposed between the lower edge 3b and the display area AR1.

The inspection lines IL1 to ILj are disposed in the non-display area AR2 along a first direction DR1.

Figure 3:
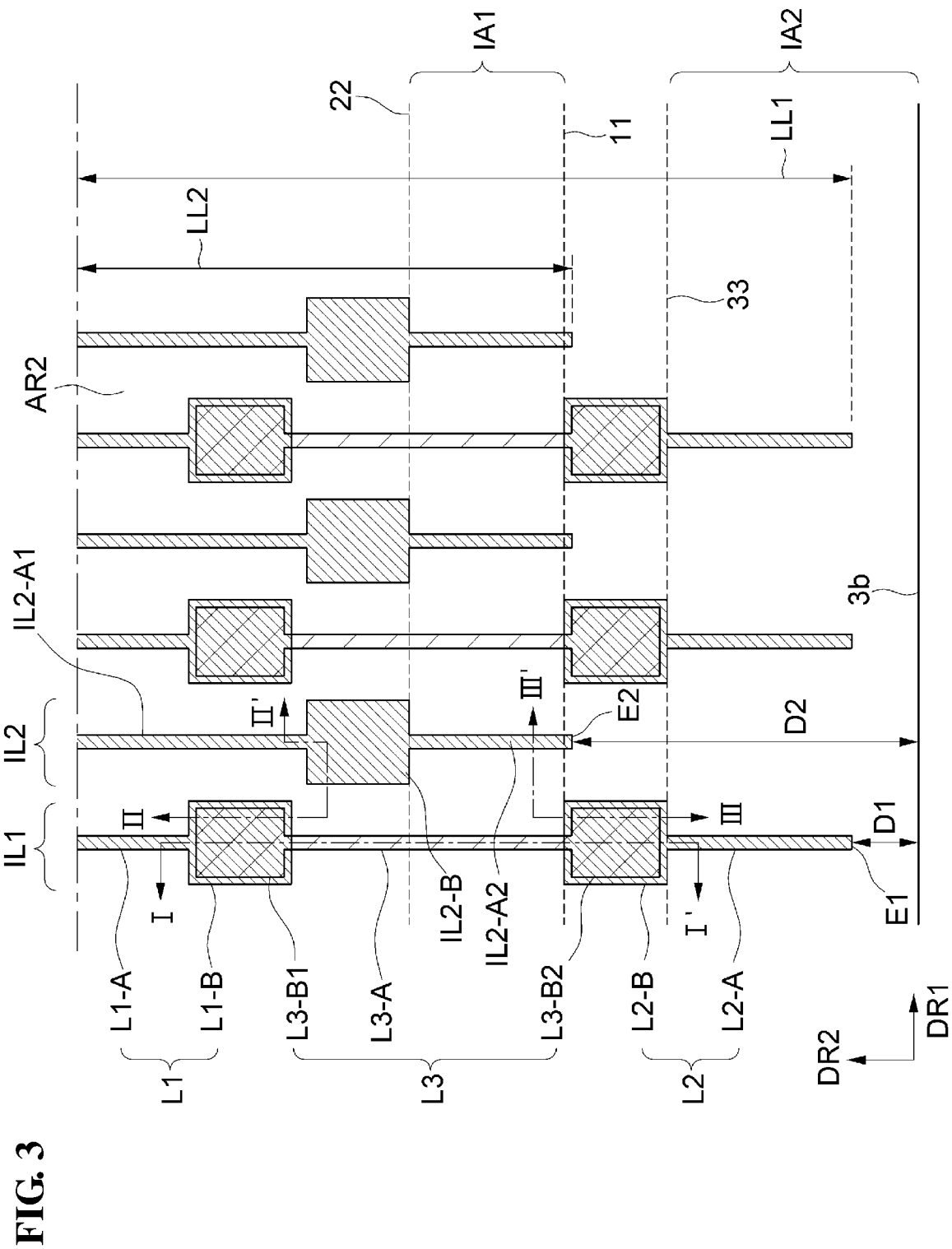
FIG. 3 is a view enlarging portion A of FIG. 1.
Figure 4:
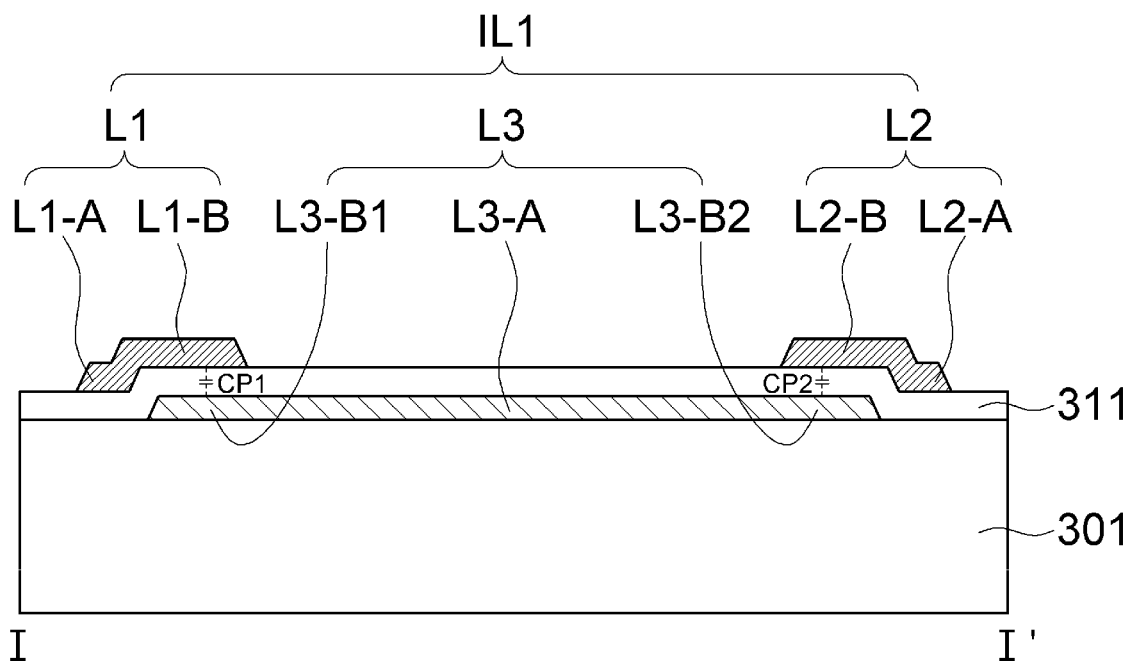
FIG. 4 is a cross-sectional view taken along the line I-I' of FIG. 3.
Figure 5:
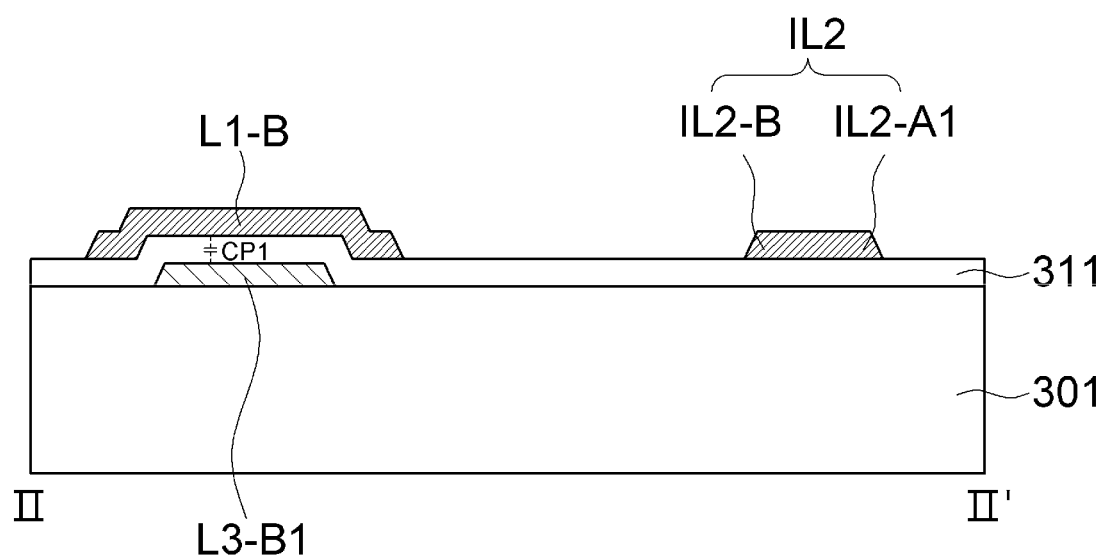
FIG. 5 is a cross-sectional view taken along the line II-II' of FIG. 3.
Figure 6:
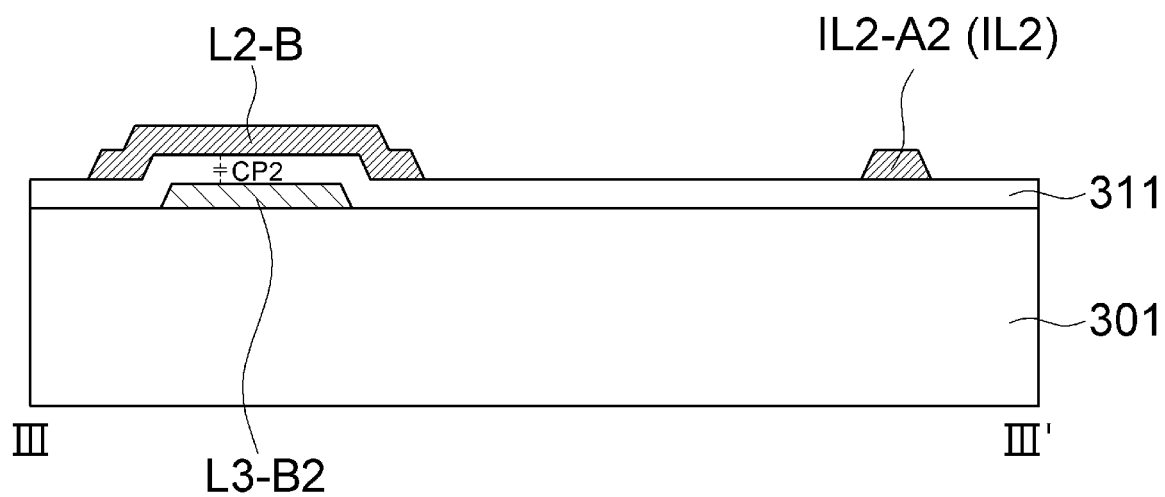
FIG. 6 is a cross-sectional view taken along the line III-III' of FIG. 3.

FIG. 3 is a view enlarging portion A of FIG. 1, FIG. 4 is a cross-sectional view taken along the line I-I' of FIG. 3, FIG. 5 is a cross-sectional view taken along the line II-II' of FIG. 3, and FIG. 6 is a cross-sectional view taken along the line III-III' of FIG. 3.

The display device includes a first inspection line IL1 and a second inspection line IL2 arranged alternately along the first direction DR1.

The first inspection line IL1 and the second inspection line IL2 are connected to data lines that are different from each other. For example, the first inspection line IL1 may be connected to an odd-numbered data line (e.g., the data lines DL1, DL3, DL5, etc.), and the second inspection line IL2 may be connected to an even-numbered data line (e.g., the data line DL2, DL4, DL6, etc.). In other words, among the plurality of inspection lines, the first inspection lines IL1 are odd-numbered inspection lines respectively connected to the odd-numbered data lines, and the second inspection lines IL2 are even-numbered inspection lines connected to the even-numbered data lines.

Each of an end E1 of the first inspection line IL1 and an end E2 of the second inspection line IL2 faces the lower edge 3b of the substrate 301. A distance D1 (hereinafter, "a first distance") from the lower edge 3b of the substrate 301 to the end E1 of the first inspection line IL1 is different from a distance D2 (hereinafter, "a second distance") from the lower edge 3b of the substrate 301 to the end E2 of the second inspection line IL2.

For example, the second distance D2 is longer than the first distance D1. Accordingly, a length LL1 of the first inspection line IL1 is longer than a length LL2 of the second inspection line IL2 in the portion A. The end E1 of the first inspection line IL1 described above corresponds to an end of a second line L2 to be described below.

The first inspection line IL1 includes a first line L1, the second line L2, and a third line L3.

The first line L1 is connected to an odd-numbered data line. According to one embodiment, the first line L1 and the odd-numbered data line are integrally formed into a unitary structure.

The first line L1 and the second inspection line IL2 are positioned on a substantially same layer, as illustrated in FIGS. 4 and 5. For example, the first line L1 and the second inspection line IL2 are positioned on a gate insulating layer 311.

Referring to FIG. 3, the first line L1 may include a line portion L1-A and a pad portion L1-B. The line portion L1-A of the first line L1 is connected to the odd-numbered data line, and the pad portion L1-B of the first line L1 is connected to the line portion L1-A of the first line L1. According to one embodiment, the line portion L1-A of the first line L1 and the pad portion L1-B of the first line L1 are integrally formed into a unitary structure.

The pad portion L1-B of the first line L1 has a width larger than a width of the line portion L1-A of the first line L1. The width of the pad portion L1-B of the first line L1 and the width of the line portion L1-A of the first line L1 are measured in the first direction DR1.

The second line L2 is positioned on a layer substantially the same as a layer on which the second inspection line IL2 is positioned, as illustrated in FIGS. 4 and 6. Accordingly, the first line L1, the second line L2 and the second inspection line IL2 are positioned on a substantially same layer. For example, the first line L1, the second line L2, and the second inspection line IL2 are positioned on the gate insulating layer 311. In addition, the data lines DL1 to DLj are also positioned a layer substantially the same as a layer on which the second inspection line IL2 is positioned. In this case, the first line L1, the second line L2, the second inspection line IL2, and the data lines DL1 to DLj are positioned on the gate insulating layer 311.

The first line L1, the second line L2, the second inspection line IL2, and the data lines DL1 to DLj may contact the gate insulating layer 311.

The first line L1, the second line L2, the second inspection line IL2, and the data lines DL1 to DLj may include a substantially same material.

The second line L2 is spaced apart from the first line L1 by a predetermined distance, as illustrated in FIGS. 3 and 4. The second line L2 and the first line L1 are not connected to each other. In other words, the second line L2 is physically separated from the first line L1.

As illustrated in FIG. 3, the second line L2 may include a line portion L2-A and a pad portion L2-B. The pad portion L2-B of the second line L2 is connected to the line portion L2-A of the second line L2. According to one embodiment, the line portion L2-A of the second line L2 and the pad portion L2-B of the second line L2 are integrally formed into a unitary structure. The pad portion L2-B of the second line L2 faces the pad portion L1-B of the first line L1.

The pad portion L2-B of the second line L2 has a width larger than a width of the line portion L2-A of the second line L2. The width of the pad portion L2-B of the second line L2 and the width of the line portion L2-A are measured in the first direction DR1.

The third line L3 is positioned on a layer different from a layer on which the second inspection line IL2 is positioned. In other words, the third line L3 is positioned on a layer different from a layer on which the first line L1, the second line L2, the second inspection line IL2, and the data lines DL1 to DLj are positioned. For example, the third line L3 is positioned on the substrate 301, as illustrated in FIG. 4. In this case, the third line L3 is positioned between the substrate 301 and the gate insulating layer 311. The upper surface and sides of the third line L3 may be entirely covered by the gate insulating layer 311 to be separated from the first line L1 and the second line L2 in a cross-sectional view. In other words, the third line L3 may be entirely surrounded by the gate insulating layer 311 and the substrate 301.

The third line L3 and the gate lines GL1 through GLi are positioned on a substantially same layer. In other words, the third line L3 and the gate lines GL1 to GLi are positioned between the substrate 301 and the gate insulating layer 311.

The third line L3 and the gate lines GL1 through GLi may include a substantially same material.

A part of the third line L3 overlaps a part of the first line L1 and a part of the second line L2, as illustrated in FIGS. 3 and 4.

Referring to FIG. 3, the third line L3 includes a first pad portion L3-B1, a second pad portion L3-B2, and a line portion L3-A. According to one embodiment, the first pad portion L3-B1, the second pad portion L3-B2, and the line portion L3-A of the third line L3 are integrally formed into a unitary structure.

The first pad portion L3-B1 of the third line L3 at least partially overlaps the pad portion L1-B of the first line L1 in a cross-sectional view. From a plan viewpoint, the first pad portion L3-B1 of the third line L3 and the pad portion L1-B of the first line L1 may have a substantially identical shape and a substantially equal area. In such an embodiment, the entire first pad portion L3-B1 of the third line L3 and the entire pad portion L1-B of the first line L1 may completely overlap each other.

Referring to FIG. 4, a first capacitor CP1 is formed in an overlap area between the third line L3 and the first line L1. Specifically, the first capacitor CP1 is formed between the first pad portion L3-B1 of the third line L3 and the pad portion L1-B of the first line L1.

The first pad portion L3-B1 of the third line L3 has a width larger than a width of the line portion L3-A of the third line L3. The width of the first pad portion L3-B1 of the third line L3 and the width of the line portion L3-A of the third line L3 are measured in the first direction DR1.

The second pad portion L3-B2 of the third line L3 at least partially overlaps the pad portion L2-B of the second line L2. From the plan viewpoint, the second pad portion L3-B2 of the third line L3 and the pad portion L2-B of the second line L2 may have a substantially identical shape and a substantially equal area. In such an embodiment, the entire second pad portion L3-B2 of the third line L3 and the entire pad portion L2-B of the second line L2 may completely overlap each other.

A second capacitor CP2 is formed in an overlap area between the third line L3 and the second line L2. Specifically, the second capacitor CP2 is formed between the second pad portion L3-B2 of the third line L3 and the pad portion L2-B of the second line L2.

The second pad portion L3-B2 of the third line L3 has a width larger than a width of the line portion L3-A of the third line L3. The width of the second pad portion L3-B2 of the third line L3 is measured in the first direction DR1 in a similar manner as the first pad portion L3-B1 of the third line L3. The width of the second pad portion L3-B2 may be substantially equal to the width of the first pad portion L3-B1.

The line portion L3-A of the third line L3 is positioned between the first pad portion L3-B1 and the second pad portion L3-B2 of the third line L3. The line portion L3-A of the third line L3 may not overlap the first line L1 and the second line L2 in a cross-sectional view as illustrated in FIG. 4.

According to one embodiment, the second inspection line IL2 and an even-numbered data line connected thereto are integrally formed into a unitary structure. The second inspection line IL2 is positioned on the gate insulating layer 311, as illustrated in FIGS. 5 and 6. The second inspection line IL2 may contact the gate insulating layer 311.

Referring to FIG. 3, the second inspection line IL2 includes a first line portion IL2-A1, a second line portion IL2-A2, and a pad portion IL2-B. According to one embodiment, the first line portion IL2-A1, the second line portion IL2-A2, and the pad portion IL2-B are integrally formed into a unitary structure.

The first line portion IL2-A1 of the second inspection line IL2 is connected to an even-numbered data line. According to one embodiment, the first line portion IL2-A1 of the second inspection line IL2 and the even-numbered data line are integrally formed into a unitary structure.

The pad portion IL2-B of the second inspection line IL2 is positioned between the first line portion IL2-A1 and the second line portion IL2-A2. The pad portion IL2-B of the second inspection line IL2 has a width larger than a width of the first line portion IL2-A1 of the second inspection line IL2. The width of the pad portion IL2-B of the second inspection line IL2 and the width of the first line portion IL2-A1 are measured in the first direction DR1.

The second line portion IL2-A2 of the second inspection line IL2 is connected to the pad portion IL2-B of the second inspection line IL2. The pad portion IL2-B of the second inspection line IL2 has a width larger than a width of the second line portion IL2-A2 of the second inspection line IL2. The width of the second line portion IL2-A2 is measured in the first direction DR1 in a similar manner as the first line portion IL2-A1.

The pad portion IL2-B of the second inspection line IL2 is positioned closer to the pad portion L1-B of the first line L1 than the pad portion L2-B of the second line L2. In other words, a distance from a center point of the pad portion IL2-B of the second inspection line IL2 to a center point of the pad portion L1-B of the first line L1 is less than a distance from the center point of the second inspection line IL2 to a center point of the pad portion L2-B of the second line L2.

Referring to FIG. 3, the first inspection line IL1 and the second inspection line IL2 is paired, and a plurality of pairs including the first inspection line IL1 and the second inspection line IL2 may be repeatedly arranged along the first direction DR1. FIG. 3 shows one example in which three pairs are arranged along the first direction DR1.

The non-display area AR2 of the substrate 301 includes a first inspection area IA1 and a second inspection area IA2. The first inspection area IA1 and the second inspection area IA2 are positioned between the display area AR1 of the substrate 301 and the lower edge 3b of the substrate 301.

The second inspection area IA2 is positioned farther from the display area AR1 than the first inspection area IA1.

The first inspection area IA1 includes an area between the pad portion L2-B (hereinafter also referred to as the lowermost pad portion L2-B) of the first inspection line IL1 and the pad portion IL2-B (hereinafter also referred to as the lowermost pad portion IL2-B) of the second inspection line IL2. Specifically, when facing surfaces of the pad portion L2-B of the first inspection line IL1 and the pad portion IL2-B of the second inspection line IL2 are defined as a first surface and a second surface, respectively, an area between a first imaginary parallel line 11 that is parallel to the first surface and passes through the first surface and a second imaginary parallel line 22 that is parallel to the second surface and passes through the second surface may be defined as the aforementioned first inspection area IA1.

In an embodiment, the first imaginary parallel line 11 may be defined as a line passing through each first surface of the pad portions L2-B of the first inspection lines IL1 adjacent to each other in the first direction DR1, and the second imaginary parallel line 22 may be defined as a line passing through each second surface of the pad portions IL2-B of the second inspection lines IL2 adjacent to each other in the first direction DR1.

The second inspection area IA2 is one of the two inspection areas that is closer to the lower edge 3b of the substrate 301.

The second inspection area IA2 includes an area between the pad portion L2-B of the first inspection line IL1 and the lower edge 3b of the substrate 301. Specifically, when a surface of the pad portion L2-B of the first inspection line IL1 that faces the lower edge 3b is defined as a third surface, an area between the lower edge 3b and a third imaginary parallel line 33 that is parallel to the third surface and passes through the third surface may be defined as the aforementioned second inspection area IA2.

In an embodiment, the third imaginary parallel line 33 may be defined as a line passing through each third surface of the pad portions L2-B of the first inspection lines IL1 adjacent to each other in the first direction DR1.

A lowermost pad portion of the first inspection line IL1 corresponds to the pad portion L2-B of the second line L2, and a lowermost pad portion of the second inspection line IL2 corresponds to the pad portion IL2-B of the second inspection line IL2. That is, when one inspection line includes a plurality of pad portions, the lowermost pad portion of the inspection line refers to the pad portion among the plurality of pad portions that is closest to the lower edge 3b of the substrate 301.

The first inspection line IL1 extends toward the lower edge 3b of the substrate 301 and overlaps the first inspection area IA1 and the second inspection area IA2.

The second inspection line IL2 extends toward the lower edge 3b of the substrate 301 and overlaps the first inspection area IA1. However, the second inspection line IL2 does not overlap the second inspection area IA2. The distance D2 from the lower edge 3b of the substrate 301 to the end E2 of the second inspection line IL2 is longer than the distance D1 from the lower edge 3b of the substrate 301 to the end E1 of the first inspection line IL1.

The first inspection line IL1 and the second inspection line IL2 that are arranged adjacent to each other in the first inspection area IA1 are positioned on different layers with respect to the gate insulating layer 311 that is interposed therebetween. For example, in the first inspection area IA1, the first inspection line IL1 is positioned below the gate insulating layer 311, and the second inspection line IL2 is positioned above the gate insulating layer 311. Accordingly, even though the first inspection line IL1 is positioned between the adjacent second inspection lines IL2 in the first inspection area IA1, the distance between the adjacent exposed inspection lines (i.e., adjacent second inspection lines IL2) in the first inspection area IA1 may be effectively increased because the first inspection line IL1 is covered by the gate insulating layer 311.

Only the first inspection line IL1 is present in the second inspection area IA2. That is, the second inspection line IL2 is not present in the second inspection area IA2. Accordingly, the distance between the adjacent inspection lines (i.e., first inspection lines IL1) in the second inspection area IA2 may be effectively increased.

Figure 7:
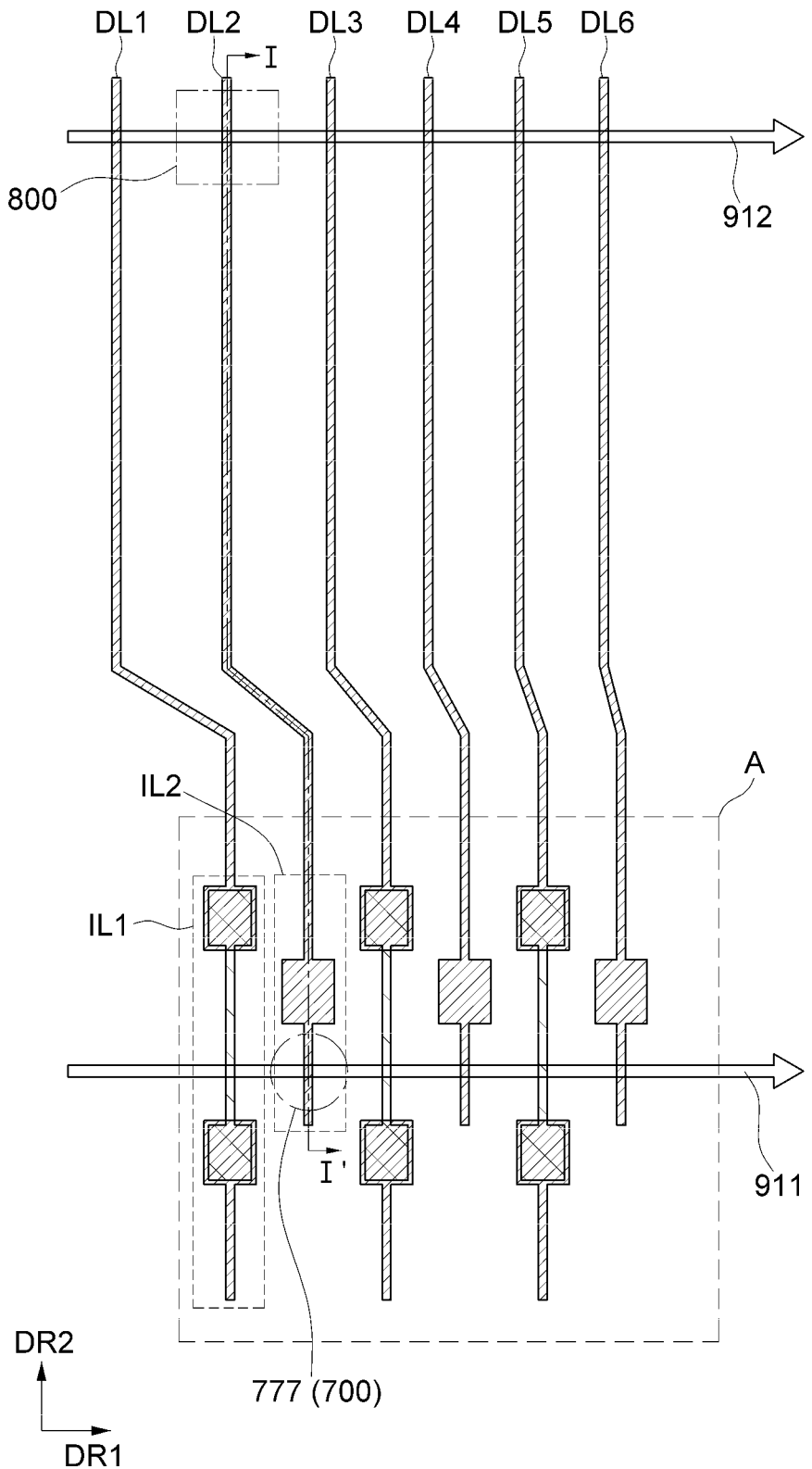
FIG. 7 is a view for explaining a method of inspecting even-numbered data lines of a display device according to an embodiment of the present disclosure.
Figure 8:
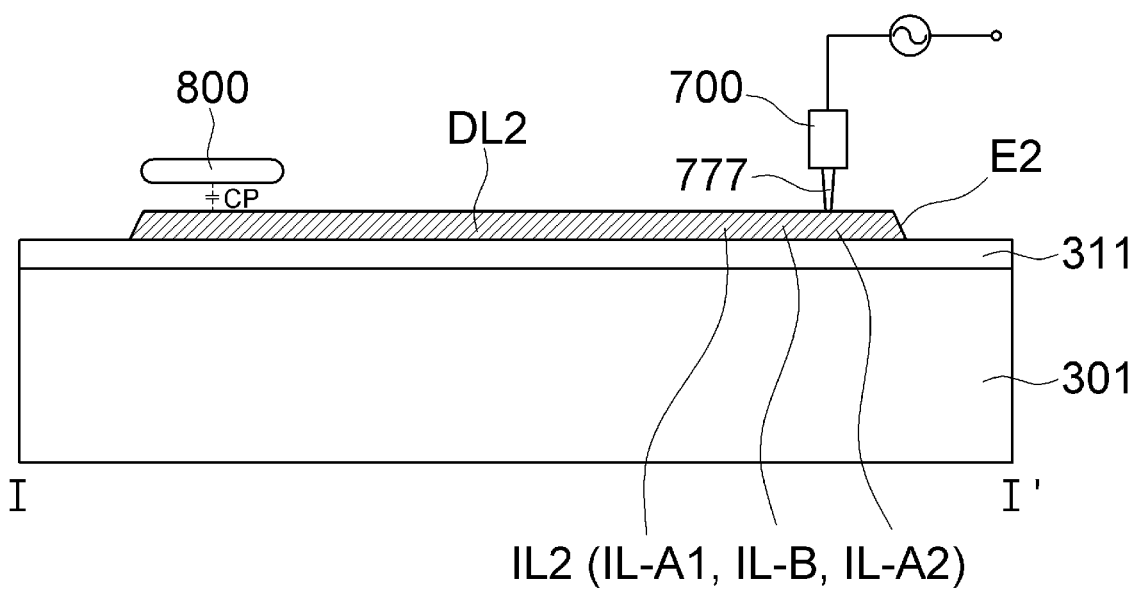
FIG. 8 is a cross-sectional view taken along the line I-I' of FIG. 7.
Figure 9:
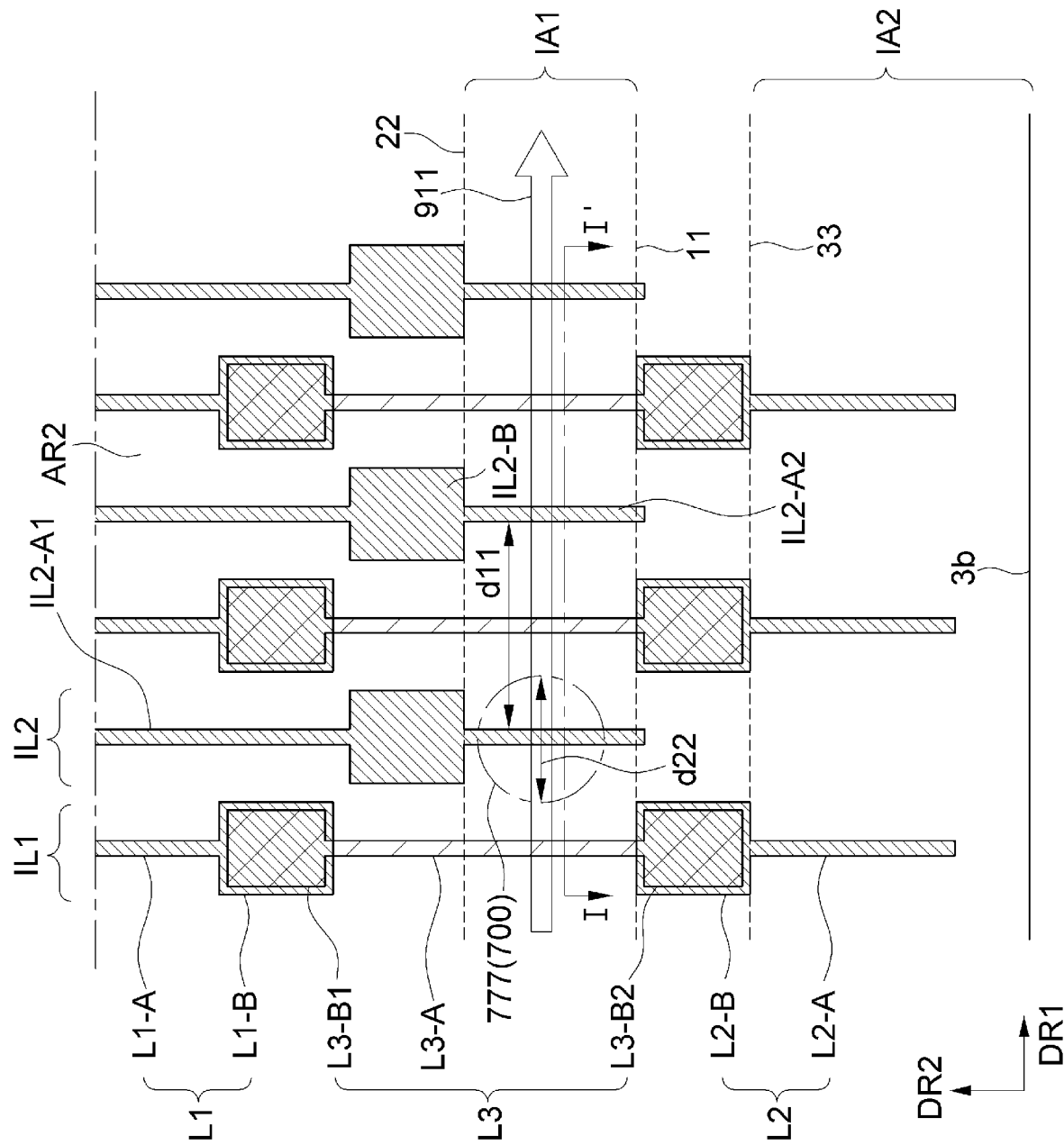
FIG. 9 is a view enlarging portion A of FIG. 7.
Figure 10:
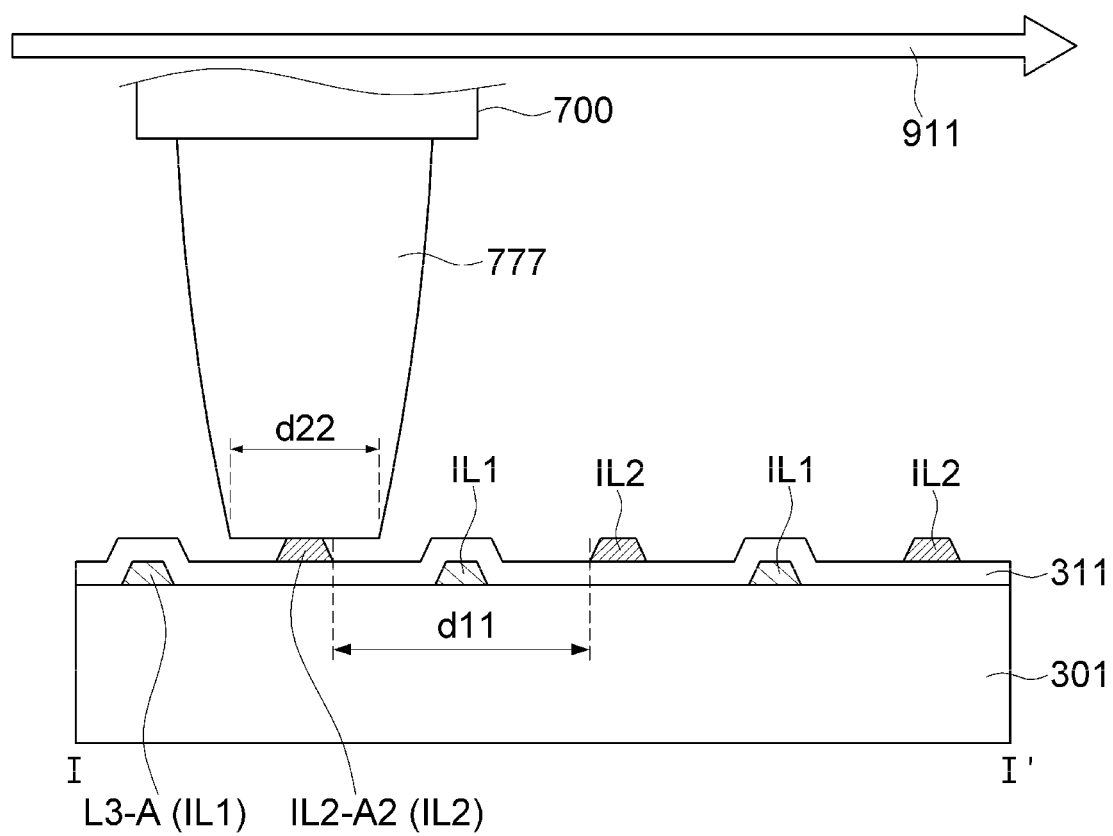
FIG. 10 is a cross-sectional view taken along the line I-I' of FIG. 9.

FIG. 7 is a view for explaining a method of inspecting even-numbered data lines of a display device according to an embodiment of the present disclosure, FIG. 8 is a cross-sectional view taken along the line I-I' of FIG. 7, FIG. 9 is a view enlarging portion A of FIG. 7, and FIG. 10 is a cross-sectional view taken along the line I-I' of FIG. 9.

First, the substrate 301 on which the gate lines and the data lines DL1 to DLj are arranged is prepared. In an embodiment, in FIGS. 7 and 8, first to sixth data lines DL1 to DL6 are shown, but the gate lines are not shown for convenience of explanation.

In an inspection process for the data lines DL1 to DLj, the data driver 136 is not connected to the substrate 301, and the fan-out lines 444 are not yet provided. Accordingly, all of the data lines DL1 to DLj remain in a floating state.

An inspection apparatus according to an embodiment of the present disclosure includes an inspection equipment 700 and a detector 800, as illustrated in FIGS. 7 and 8.

The inspection equipment 700 provides an inspection signal. The inspection signal may be, for example, an AC signal having a predetermined period.

The inspection equipment 700 is positioned on the first inspection area IA1 of the substrate 301 and moves along the direction indicated by a first arrow 911 in the first inspection area IA1. For example, the inspection equipment 700 moves from a left edge 3c of the substrate 301 to a right edge 3d of the substrate 301 along the direction of the first arrow 911 in the first inspection area IA1.

FIGS. 7, 9 and 10 illustrate the method of inspection in which the inspection equipment 700 moving along the direction of the first arrow 911 is positioned on one of the second inspection lines IL2.

The first inspection line IL1 and the second inspection line IL2 are arranged alternately along the first direction DR1 in the first inspection area IA1. Specifically, in the first inspection area IA1, the line portion of the first inspection line IL1 (i.e., the line portion L3-A of the third line L3) and the second line portion IL2-A2 of the second inspection line IL2 are arranged alternately along the first direction DR1.

As illustrated in FIG. 10, the portions of the first inspection lines IL1 in the first inspection area IA1 are positioned between the substrate 301 and the gate insulating layer 311, and the portions of the second inspection lines IL2 in the first inspection area IA1 are positioned on the gate insulating layer 311. Accordingly, while the first inspection lines IA1 in the first inspection area IA1 are protected by the gate insulating layer 311, the second inspection lines IL2 in the first inspection area IA1 are exposed.

As the inspection equipment 700 moves along the first inspection area IA1, as illustrated in FIG. 10, an output terminal 777 of the inspection equipment 700 contacts only the second inspection lines IL2 in a selective manner. That is, in the first inspection area IA1, the output terminal 777 of the inspection equipment 700 does not contact the first inspection lines IL1. Accordingly, as the inspection equipment 700 moves from the left edge 3c of the substrate 301 to the right edge 3d of the substrate 301 in the first inspection area IA1, the inspection signal provided by the inspection equipment 700 is selectively applied only to the second inspection lines IL2. In such an embodiment, the second inspection lines IL2 in the first inspection area IA1 sequentially receive inspection signals one by one. Since an interval d11 between the adjacent second inspection lines IL2 in the first inspection area IA1 is sufficiently larger than a width d22 of the output terminal 777 of the inspection equipment 700, the output terminal 777 does not simultaneously contact two or more adjacent second inspection lines IL2 at a time in the inspection area IA1. In other words, the output terminal 777 of the inspection equipment 700 contacts only one of the second inspection lines IL2 at a time.

In the embodiment illustrated in FIG. 7, the detector 800 moves along ends of the data lines DL1 to DLj adjacent to the upper edge 3a of the substrate 301. For example, the detector 800 moves along the direction indicated by a second arrow 912 in FIG. 7.

The embodiment illustrated in FIG. 7 shows that the detector 800 moving along the direction of the second arrow 912 is located on the end of one of the data lines DL2 while the inspection equipment 700 moving along the direction of the first arrow 911 is located on the end E2 of the second inspection line IL2 that extends from the data line DL2.

Referring to FIG. 7, the detector 800 moves along the direction of the second arrow 912 while being spaced apart from the data line DL2 with a predetermined distance. A detection capacitor CP is formed between the detector 800 and the data line DL2.

When the inspection equipment 700 contacts one of the second inspection lines IL2, the detector 800 is located on the end of the data line DL2 that is connected to the one of the second inspection lines IL2. In other words, the inspection equipment 700 and the detector 800 are located corresponding to the second inspection line IL2 and the data line DL2 that are connected to each other, respectively.

As illustrated in FIG. 8, the inspection signal provided by the inspection equipment 700 is applied to the second inspection line IL2 through the output terminal 777 of the inspection equipment 700. Specifically, the inspection signal is applied to the second line portion IL2-A2 of the second inspection line IL2.

The inspection signal applied to the second inspection line IL2 is transmitted to the detector 800 through the data line DL2 that is connected to the second inspection line IL2. The detector 800 analyzes the detected inspection signal to determine whether the data line DL2 is defective or not.

As the inspection equipment 700 moves from the left edge 3c of the substrate 301 to the right edge 3d of the substrate 301 in the first inspection area IA1, the inspection signals are sequentially applied to the entirety of the second inspection lines IL2 in the first inspection area IA1. Accordingly, all of the even-numbered data lines DL2, DL4, . . . , and DLj (j being an even number) sequentially receive the inspection signals.

An output signal is generated from the data line to which the inspection signal is applied and transmitted to the detector 800, and this output signal may have a different value depending on the resistance and the capacitance of the corresponding data line.

The detector 800 sequentially receives the output signals from the even-numbered data lines DL2, DL4, and DLj (j being an even number), and determines whether there is a defect in each of the even-numbered data lines DL2, DL4, . . . , and DLj based on the output signals.

Thereafter, defect inspection is performed on the odd-numbered data lines DL1, DL3, . . . , DLj−1 (j being an even number), which will be described in detail with reference to FIGS. 11 to 14.

Figure 11:
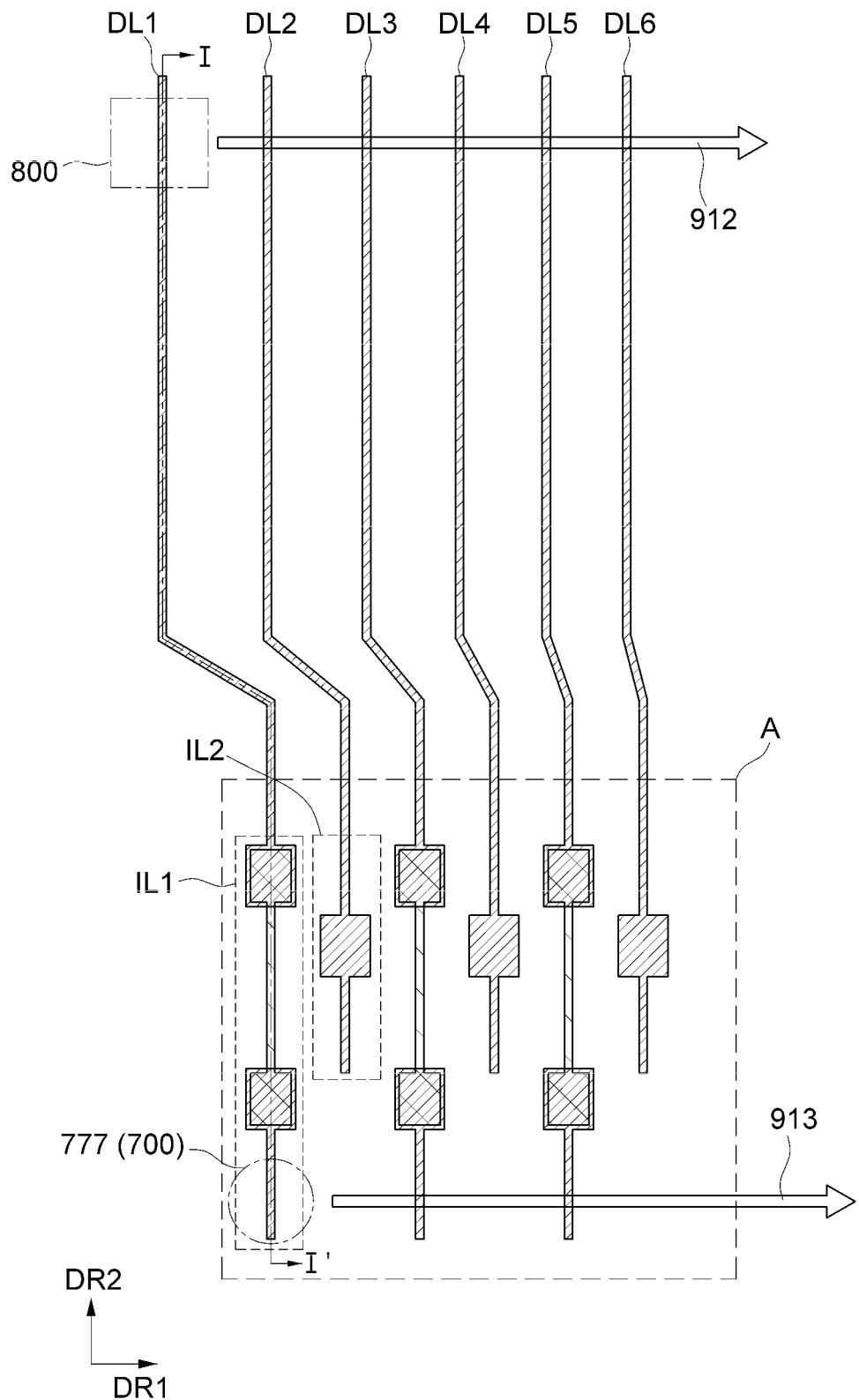
FIG. 11 is a view for explaining a method of inspecting odd-numbered data lines of a display device according to an embodiment of the present disclosure.
Figure 12:
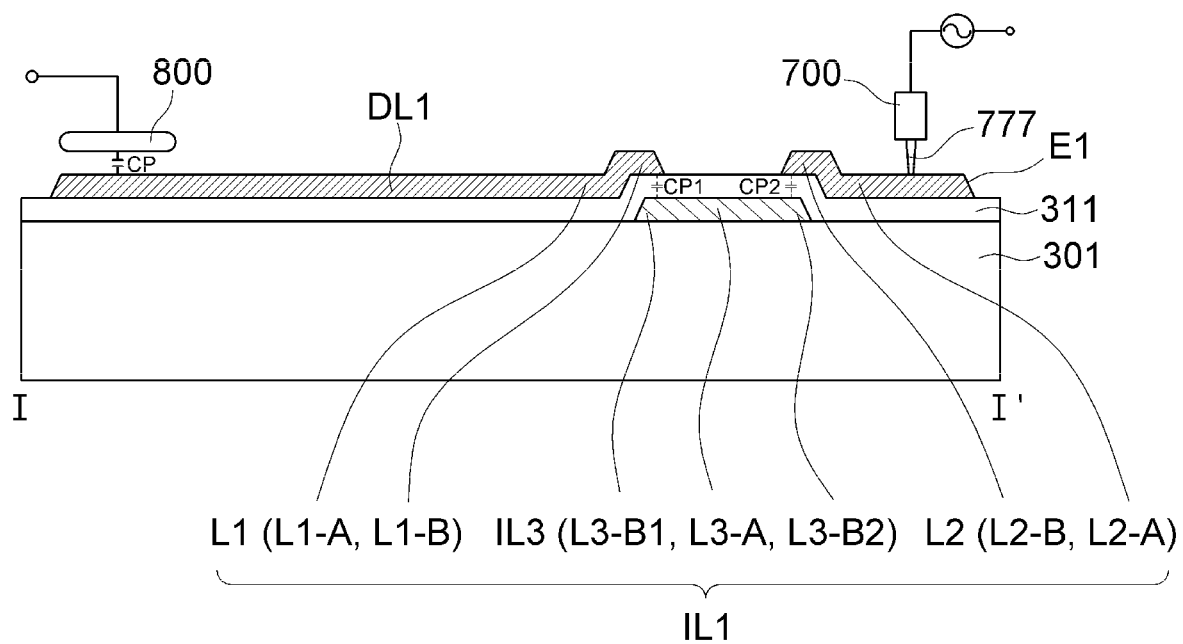
FIG. 12 is a cross-sectional view taken along the line I-I' of FIG. 11.
Figure 13:
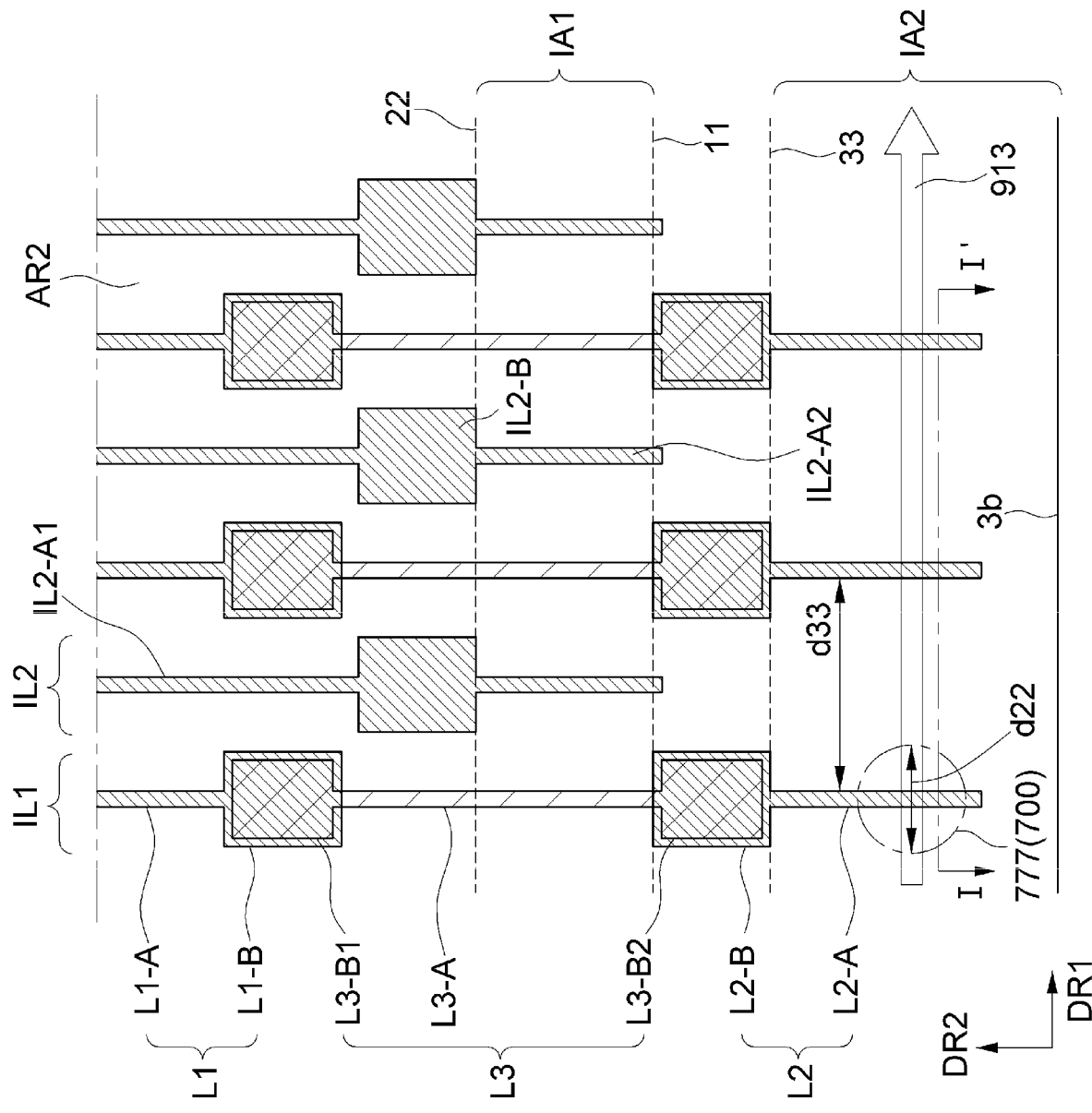
FIG. 13 is a view enlarging portion A of FIG. 11.
Figure 14:
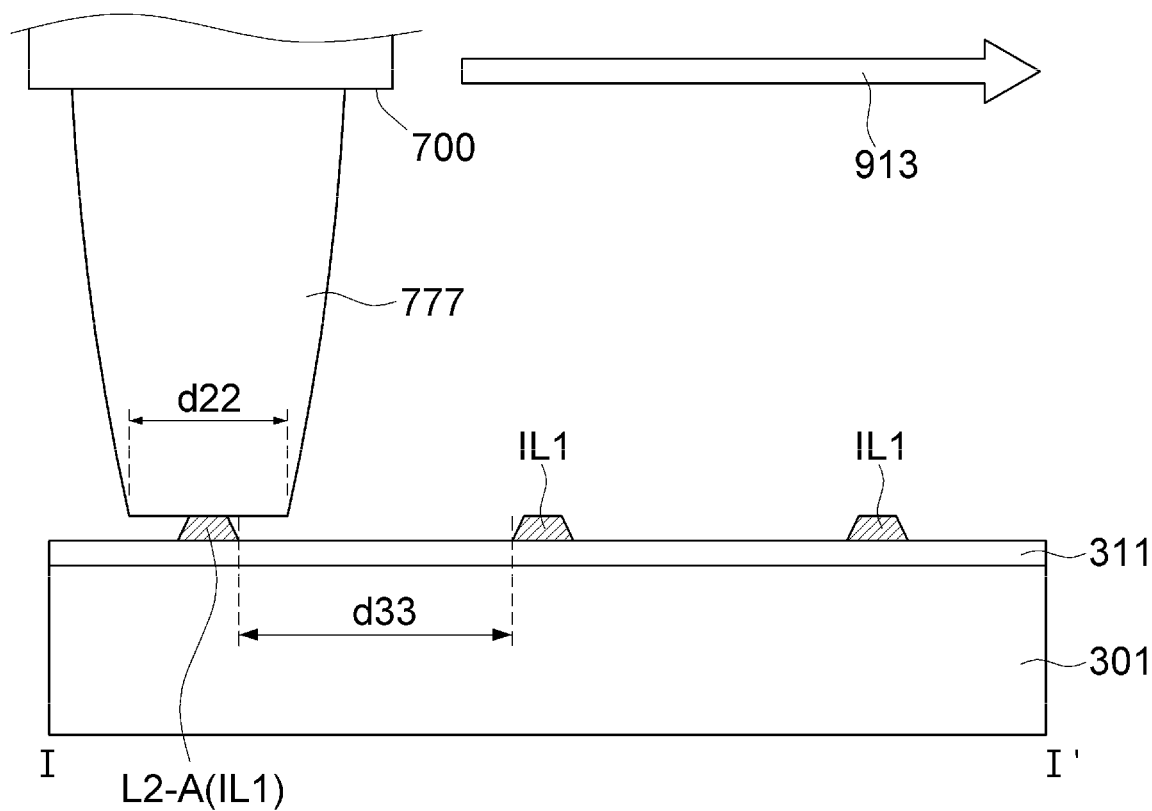
FIG. 14 is a cross-sectional view taken along the line I-I' of FIG. 13.

FIG. 11 is a view for explaining a method of inspecting odd-numbered data lines of a display device according to an embodiment of the present disclosure, FIG. 12 is a cross-sectional view taken along the line I-I' of FIG. 11, FIG. 13 is a view enlarging portion A of FIG. 11, and FIG. 14 is a cross-sectional view taken along the line I-I' of FIG. 13.

The inspection equipment 700 is positioned on the second inspection area IA2 of the substrate 301 and moves along the direction indicated by a third arrow 913 in the second inspection area IA2. For example, the inspection equipment 700 moves from the left edge 3c of the substrate 301 to the right edge 3d of the substrate 301 along the direction of the third arrow 913 in the second inspection area IA2.

FIGS. 11, 13 and 14 illustrate the method of inspection in which the inspection equipment 700 moving along the direction of the third arrow 913 is positioned on one of the first inspection lines IL1.

The first inspection lines IL1 are arranged alternately along the first direction DR1 in the second inspection area IA2. Specifically, in the second inspection area IA2, the line portions of the first inspection line IL1 (i.e., the line portions L2-A of the second line L2) are disposed alternately along the first direction DR1.

As illustrated in FIG. 14, portions of the first inspection lines IL1 in the second inspection area IA2 are positioned on the gate insulating layer 311. Accordingly, the first inspection lines IL1 in the second inspection area IA2 are exposed.

As the inspection equipment 700 moves along the second inspection area IA2, as illustrated in FIG. 14, the output terminal 777 of the inspection equipment 700 contacts the first inspection lines IL1. Accordingly, as the inspection equipment 700 moves from the left edge 3c of the substrate 301 to the right edge 3d of the substrate 301 in the second inspection area IA2, the inspection signal provided by the inspection equipment 700 is applied to the first inspection lines IL1. In such an embodiment, the first inspection lines IL1 in the second inspection area IA2 sequentially receive inspection signals one by one. Since an interval d33 between adjacent first inspection lines IL1 in the second inspection area IA2 is sufficiently larger than the width d22 of the output terminal 777 of the inspection equipment 700, the output terminal 777 does not simultaneously contact two or more adjacent first inspection lines IL1 at a time in the second inspection area IA2. In other words, the output terminal of the inspection equipment 700 contacts only one of the first inspection lines IL1 at a time.

In the embodiment illustrated in FIG. 11, the detector 800 moves along the ends of the data lines DL1 to DLj adjacent to the upper edge 3a of the substrate 301. For example, the detector 800 moves along the direction indicated by the second arrow 912 in FIG. 11.

The embodiment illustrate in FIG. 11 shows that the detector 800 moving along the direction of the second arrow 912 is located on the end of one of the data lines DL1 while the inspection equipment 700 moving along the direction of the third arrow 913 is located on the end E1 of the first inspection line IL1 that extends from the data line DL1.

Referring to FIG. 12, the detector 800 moves along the direction of the second arrow 912 while being spaced apart from the data line DL1 by a predetermined distance. A detection capacitor CP is formed between the detector 800 and the data line DL1.

When the inspection equipment 700 contacts one of the first inspection lines IL1, the detector 800 is located on the end of the data line DL1 that is connected to the one of the first inspection lines IL1. In other words, the inspection equipment 700 and the detector 800 are located corresponding to the first inspection line IL1 and the data line DL1 that are connected to each other, respectively.

As illustrated in FIG. 12, the inspection signal provided by the inspection equipment 700 is applied to the first inspection line IL1 through the output terminal 777 of the inspection equipment 700. Specifically, the inspection signal is applied to the second line L2 of the first inspection line IL1, transmitted to the third line L3 through the second capacitor CP2, and transmitted to the first line L1 through the first capacitor CP1.

The inspection signal applied to the first inspection line IL1 is transmitted to the detector 800 through the data line DL1 that is connected to the first inspection line IL1. The detector 800 analyzes the detected inspection signal to determine whether the data line DL1 is defective or not.

As the inspection equipment 700 moves from the left edge 3c of the substrate 301 to the right edge 3d of the substrate 301 in the second inspection area IA2, the inspection signals are sequentially applied to the entirety of the first inspection lines IL1 in the second inspection area IA2. Accordingly, all the odd-numbered data lines DL1, DL3, . . . , and DLj−1 (j being an even number) receive the inspection signals sequentially.

An output signal is generated from the data line to which the inspection signal is applied and transmitted to the detector 800, and this output signal may have a different value depending on the resistance and the capacitance of the corresponding data line.

The detector 800 sequentially receives output signals from the odd-numbered data lines DL1, DL3, . . . , and DLj−1 (j being an even number) and determines whether there is a defect in each of the odd-numbered data lines DL1, DL3, . . . , and DLj−1 based on the output signals.

Hereinafter, a method of determining a defect of a data line will be described in detail with reference to FIGS. 15 to 21.

Figure 15:
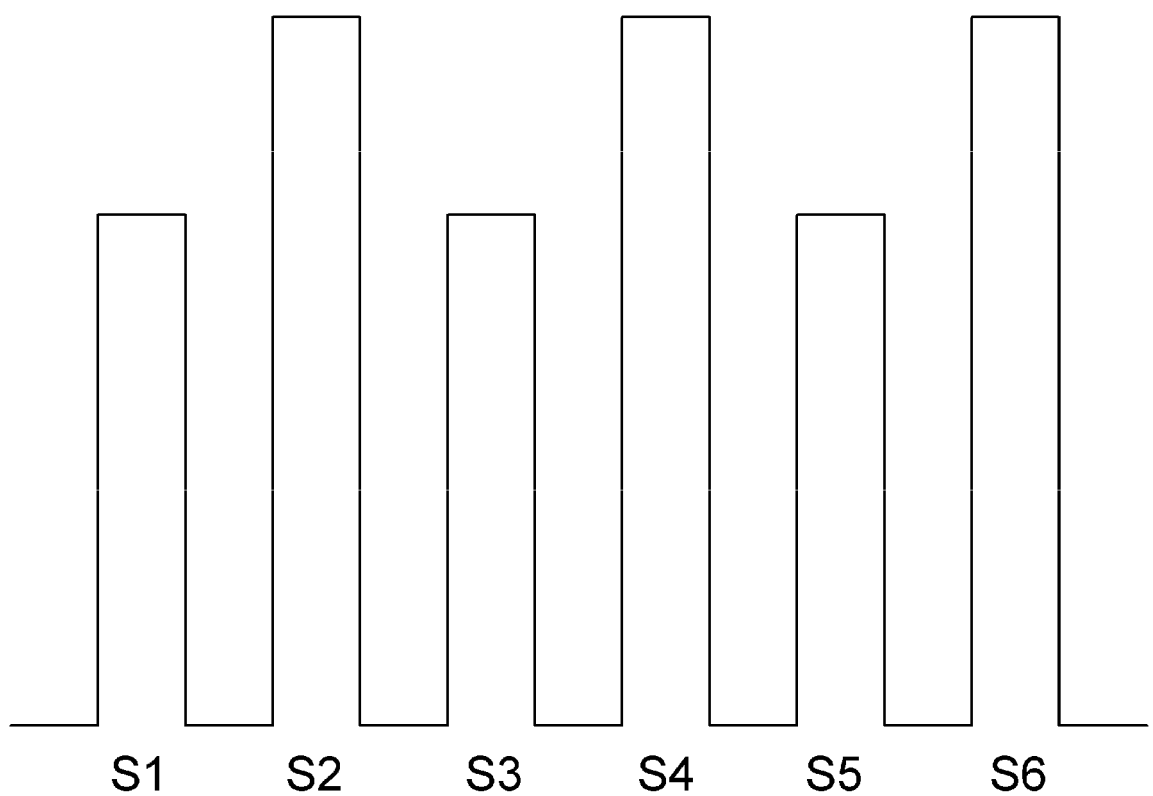
FIG. 15 is a diagram showing output signals detected from normal data lines.

FIG. 15 is a diagram showing output signals detected from normal data lines.

For example, as illustrated in FIG. 7, when there is no defect in the first to sixth data lines DL1 to DL6, first to sixth output signals S1, S2, S3, S4, S5, and S6 that are detected from the first to sixth data lines DL1 to DL6 may have a waveform illustrated in FIG. 15.

The first output signal S1 is the signal detected from the first data line DL1, the second output signal S2 is the signal detected from the second data line DL2, the third output signal S3 is the signal detected from the third data line DL3, the fourth output signal S4 is the signal detected from the fourth data line DL4, the fifth output signal S5 is the signal detected from the fifth data line DL5, and the sixth output signal S6 is the signal detected from the sixth data line DL6.

The odd-numbered data lines DL1, DL3, and DL5 are connected to the aforementioned first inspection line IL1, and the even-numbered data lines DL2, DL4, and DL6 are connected to the aforementioned second inspection line IL2. Since the first inspection line IL1 has a capacitance greater than a capacitance of the second inspection line IL2 (the capacitance being a parasitic capacitance due to the first capacitor CP1 or the second capacitor CP2), the output signal of the odd-numbered data lines DL1, DL3, and DL5 connected to the first inspection line IL1 is less than the output signal of the even-numbered data lines DL2, DL4, and DL6 connected to the second inspection line IL2.

The first, third, and fifth output signals S1, S3, and S5 that are detected from the normal odd-numbered data lines DL1, DL3, and DL5, respectively, have a substantially equal magnitude. The normal first, third, and fifth output signals S1, S3, and S5 have a magnitude within a predetermined normal range.

In addition, the second, fourth, and sixth output signals S2, S4 and S6 that are detected from the normal even-numbered data lines DL2, DL4, and DL6, respectively, have a substantially equal magnitude. The normal second, fourth, and sixth output signals S2, S4, and S6 have a magnitude within a predetermined normal range.

Figure 16:
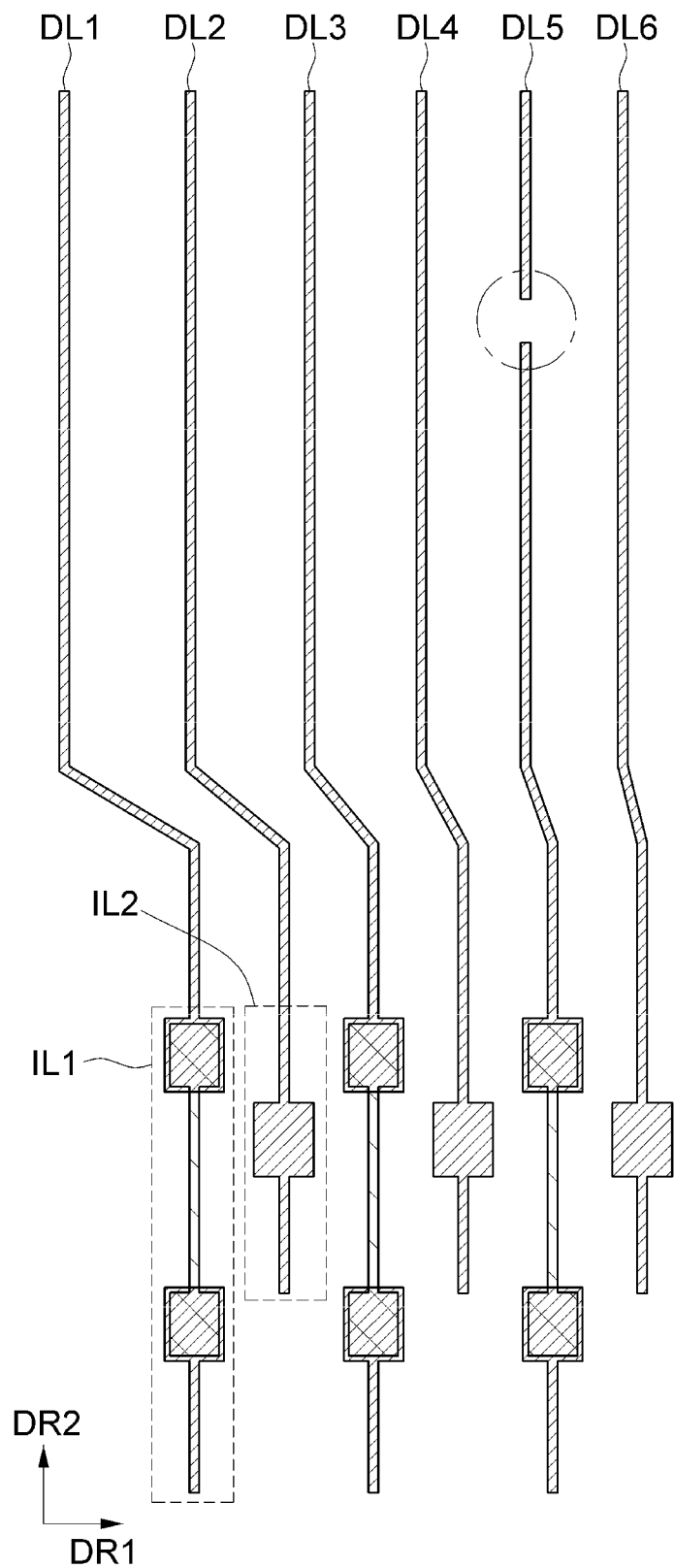
FIG. 16 is a view illustrating a disconnection defect of one of the data lines.
Figure 17:
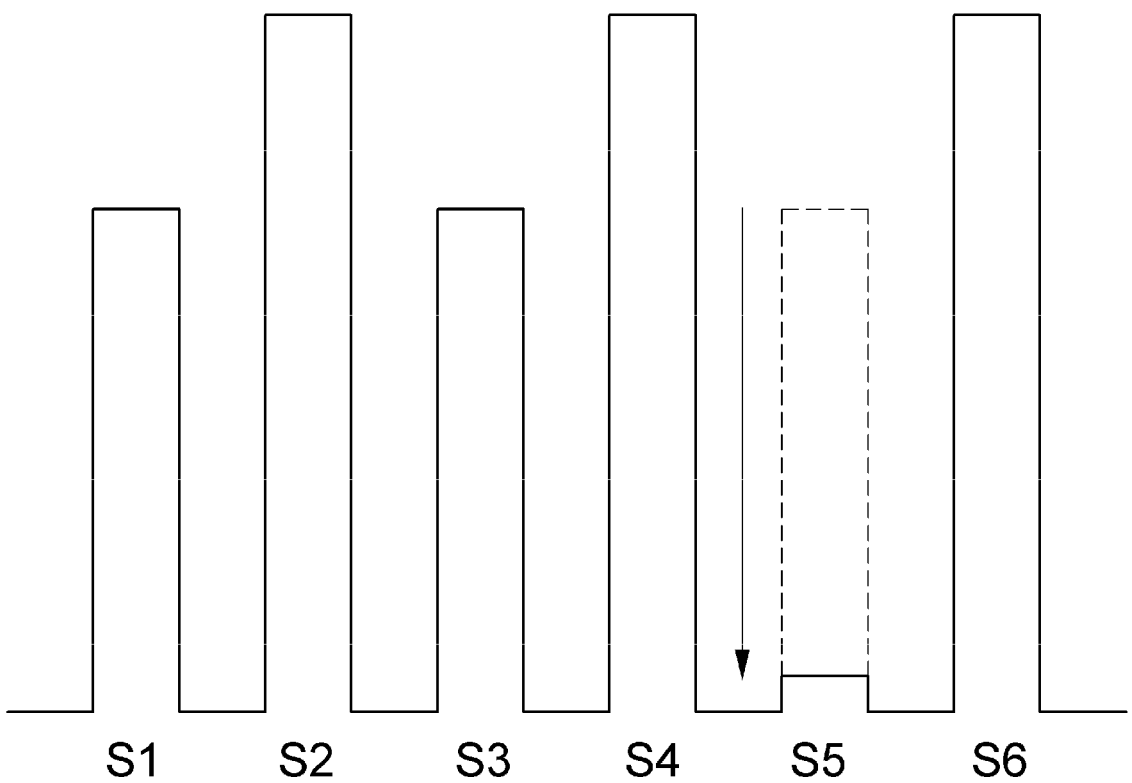
FIG. 17 is a diagram illustrating output signals detected from the data lines of FIG. 16.

FIG. 16 is a view illustrating a disconnection defect of one of the data lines, and FIG. 17 is a diagram illustrating output signals detected from the data lines of FIG. 16.

For example, as illustrated in FIG. 16, when a defect occurs in which a part of the fifth data line DL5 is disconnected (in an area indicated by a circular dotted line of FIG. 16), the first to sixth output signals S1 to S6 may have the waveform illustrated in FIG. 17.

In FIG. 17, the first output signal S1 is the signal detected from the first data line DL1, the second output signal S2 is the signal detected from the second data line DL2, the third output signal S3 is the signal detected from the third data line DL3, the fourth output signal S4 is the signal detected from the fourth data line DL4, the fifth output signal S5 is the signal detected from the fifth data line DL5, and the sixth output signal S6 is the signal detected from the sixth data line DL6.

As illustrated in FIG. 17, although the first, second, third, fourth, and sixth output signals S1, S2, S3, S4, and S6 have normal magnitudes as illustrated in FIG. 15, the fifth output signal S5 has a magnitude close to zero. Accordingly, when the output signals having the waveform as illustrated in FIG. 17 are detected, it is determined that a disconnection defect occurs in the fifth data line DL5.

Figure 18:
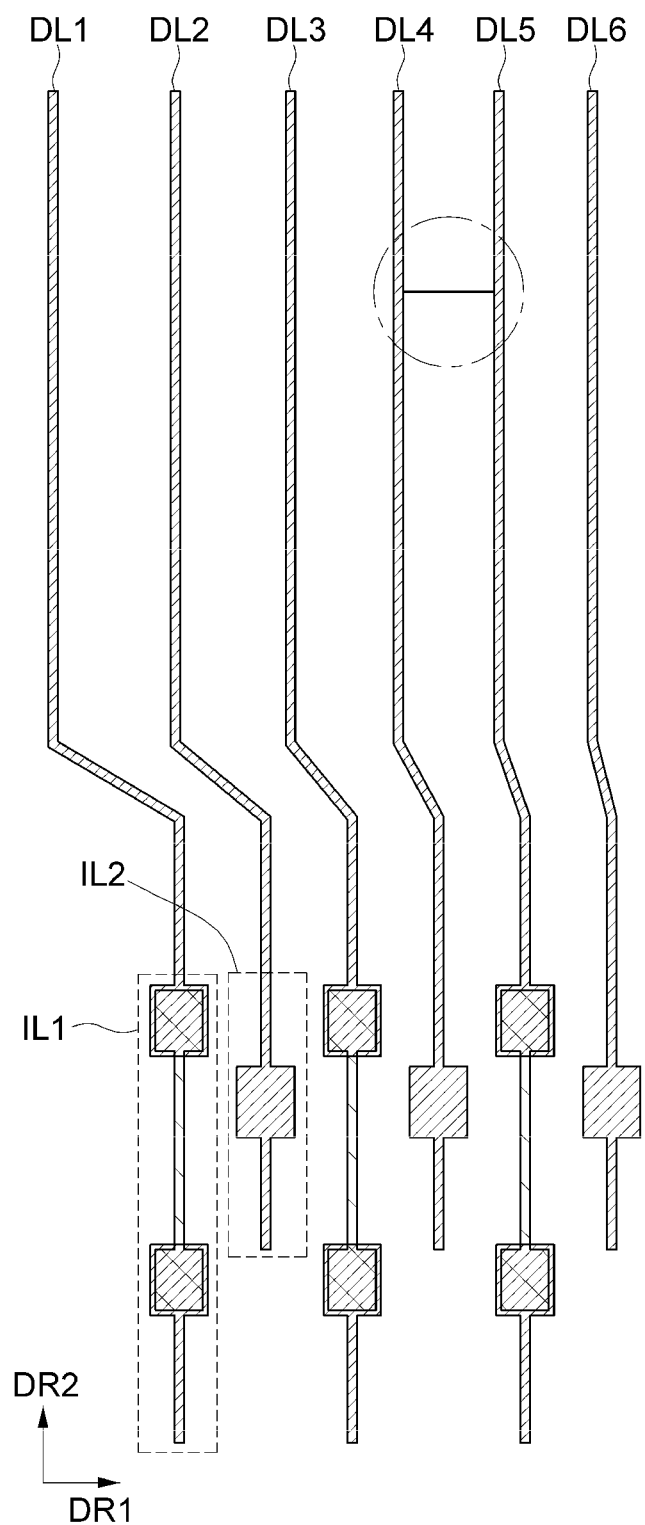
FIG. 18 is a view illustrating a short-circuit defect due to contact between adjacent data lines.
Figure 19:
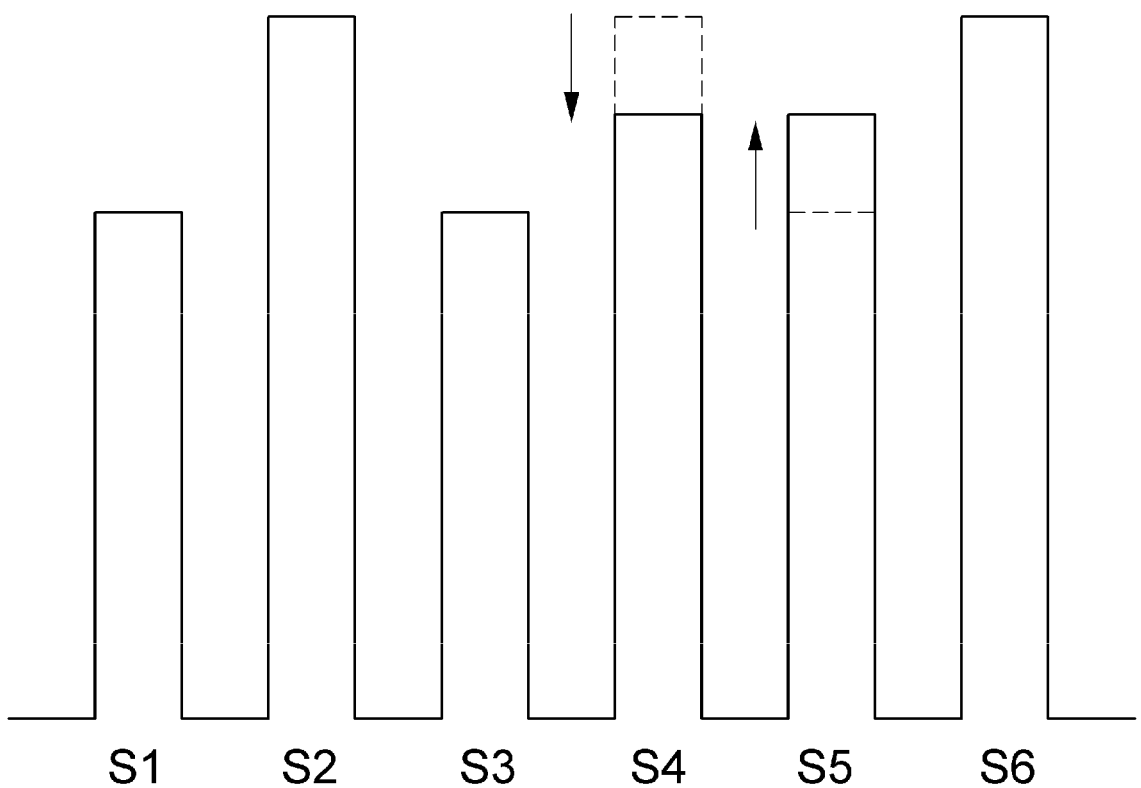
FIG. 19 is a diagram illustrating output signals detected from the data lines of FIG. 18.

FIG. 18 is a view illustrating a short-circuit defect due to contact between adjacent data lines, and FIG. 19 is a diagram illustrating output signals detected from the data lines of FIG. 18.

For example, as illustrated in FIG. 18, when a short-circuit defect occurs in which the fourth data lines DL4 and the fifth data lines DL5 that are adjacent to each other contact each other (in an area indicated by a circular dotted line of FIG. 18), the first to sixth output signals S1 to S6 may have the waveform illustrated in FIG. 19.

In FIG. 19, the first output signal S1 is the signal detected from the first data line DL1, the second output signal S2 is the signal detected from the second data line DL2, the third output signal S3 is the signal detected from the third data line DL3, the fourth output signal S4 is the signal detected from the fourth data line DL4, the fifth output signal S5 is the signal detected from the fifth data line DL5, and the sixth output signal S6 is the signal detected from the sixth data line DL6.

As illustrated in FIG. 19, although the first, second, third, and sixth output signals S1, S2, S3, and S6 have normal magnitudes as illustrated in FIG. 15, the fourth output signal S4 has a magnitude less than its normal magnitude, and the fifth output signal S5 has a magnitude greater than its normal magnitude. For example, the fourth output signal S4 and the fifth output signal S5 may have a substantially equal magnitude. Accordingly, when the output signals having the waveform as illustrated in FIG. 19 are detected, it is determined that a short-circuit defect occurs between the fourth and fifth data lines DL4 and DL5.

Figure 20:
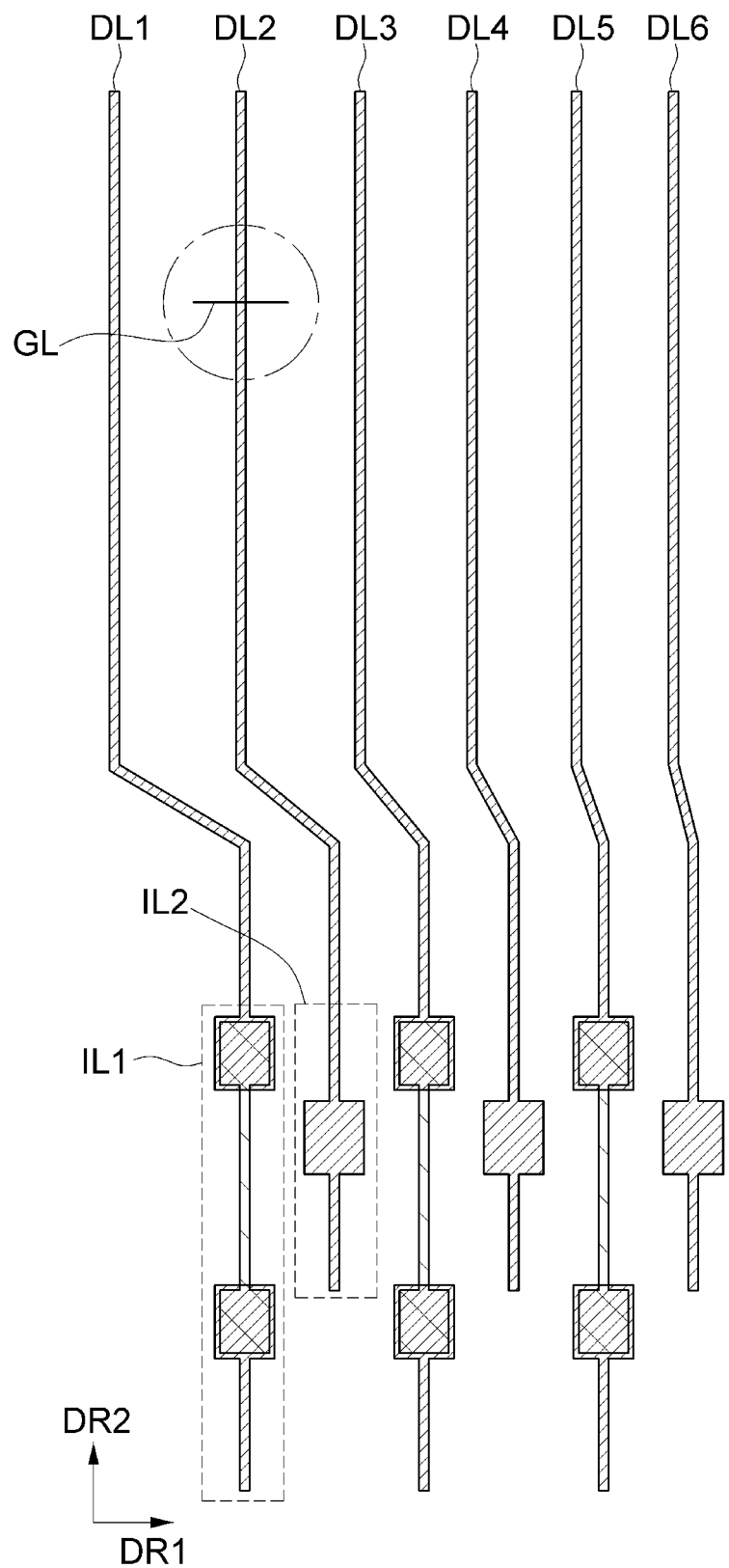
FIG. 20 is a view illustrating a short-circuit defect due to contact between a data line and a gate line.
Figure 21:
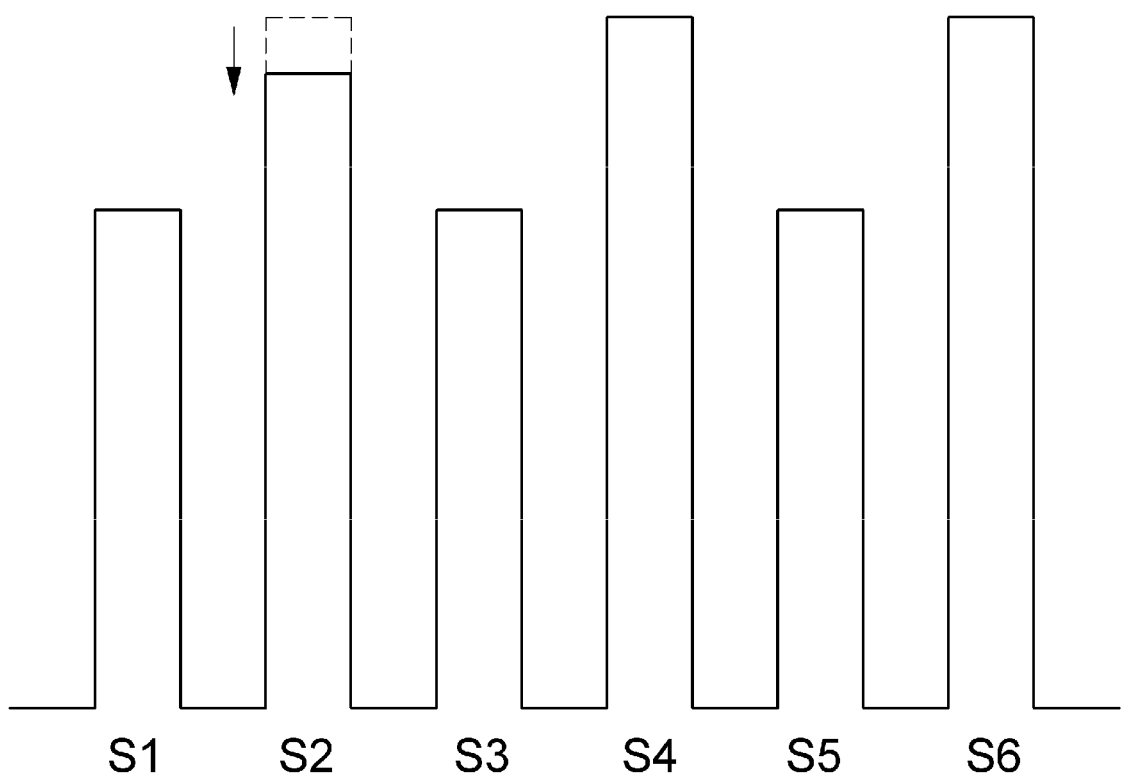
FIG. 21 is a diagram showing output signals detected from the data lines of FIG. 20.

FIG. 20 is a view illustrating a short-circuit defect due to contact between a data line and a gate line, and FIG. 21 is a diagram showing output signals detected from the data lines of FIG. 20.

For example, as illustrated in FIG. 20, when a short-circuit defect occurs in which the second data line DL2 contacts one of the gate lines, the first to sixth output signals S1 to S6 may have the waveform illustrated in FIG. 21.

In FIG. 21, the first output signal S1 is the signal detected from the first data line DL1, the second output signal S2 is the signal detected from the second data line DL2, the third output signal S3 is the signal detected from the third data line DL3, the fourth output signal S4 is the signal detected from the fourth data line DL4, the fifth output signal S5 is the signal detected from the fifth data line DL5, and the sixth output signal S6 is the signal detected from the sixth data line DL6.

As illustrated in FIG. 21, although the first, third, fourth, fifth, and sixth output signals S1, S3, S4, S5, and S6 have normal magnitudes as illustrated in FIG. 15, the second output signal S2 has a magnitude less than its normal magnitude. Accordingly, when the output signals having the waveform as illustrated in FIG. 21 are detected, it is determined that a short-circuit defect occurs between the second data line DL2 and the gate line.

In an embodiment, when it is detected that a data line is defective, the inspection equipment 700 and the detector 800 can determine which part of the data line is defective. To this end, the inspection equipment 700 contacts the pad portion (e.g., the lowermost pad portion) of the inspection line connected to the data line that includes the defective portion. The inspection equipment 700 applies an output signal to the pad portion. Thereafter, in a state that the output terminal 777 of the inspection equipment 700 contacts the pad portion, the detector 800 moves along the data line that is defective. For example, the detector 800 may move in the direction opposite to the second direction DR2 from the upper end of the data line.

The output signal applied to the detector 800 from the defective position has a magnitude different from the normal output signal. Accordingly, the exact position (e.g., coordinates) of the defective data line may be determined.

Figure 22:
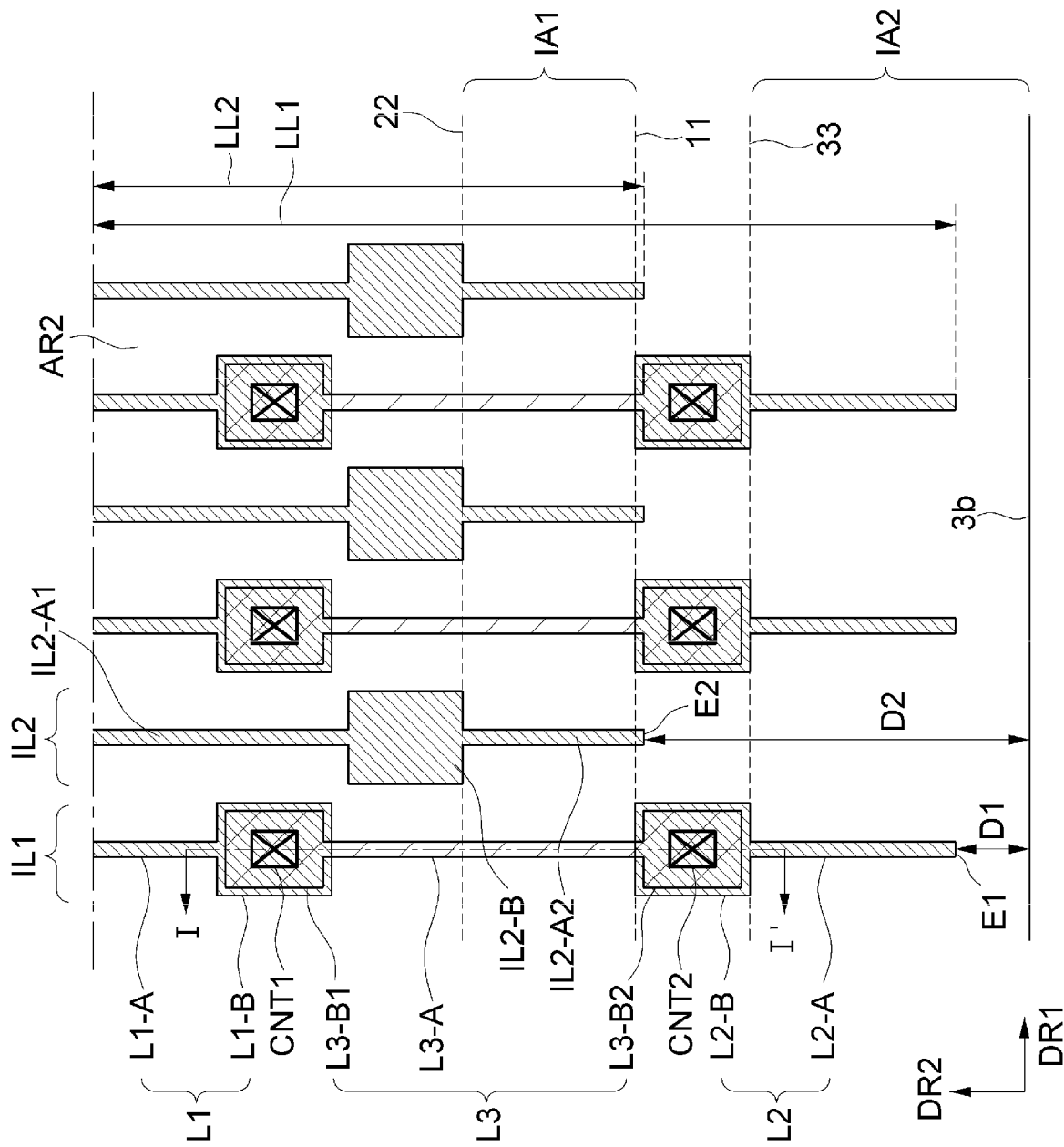
FIG. 22 is a view enlarging portion A of FIG. 1 according to another embodiment of the present disclosure.
Figure 23:
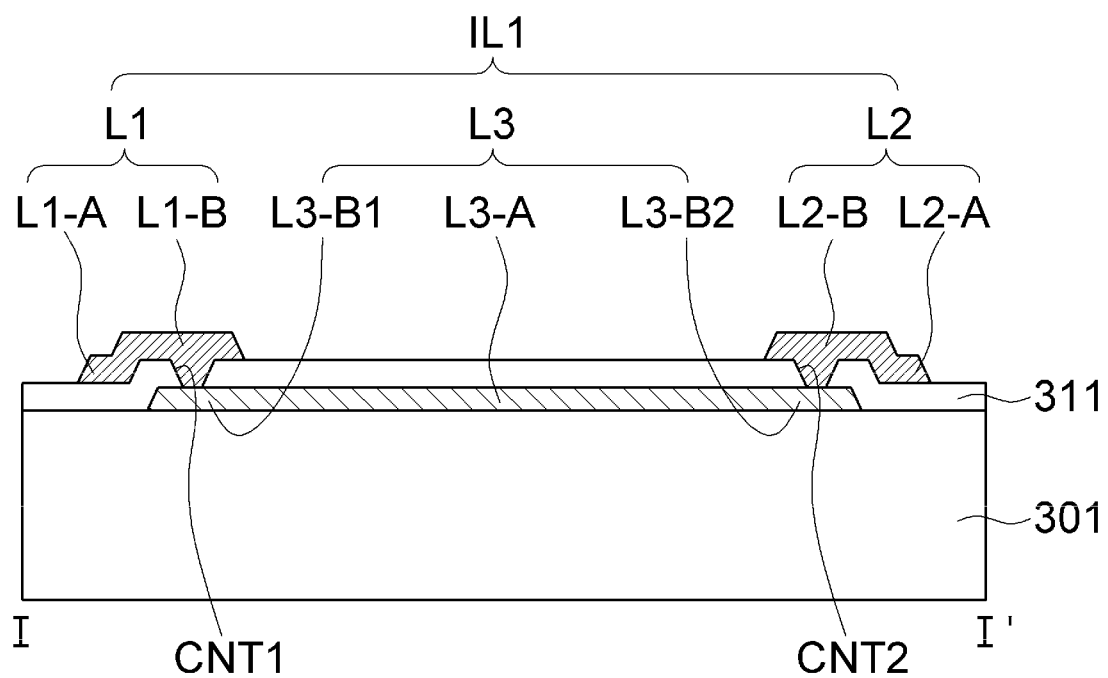
FIG. 23 is a cross-sectional view taken along the line I-I' of FIG. 22.

FIG. 22 is a view enlarging portion A of FIG. 1 according to another embodiment of the present disclosure, and FIG. 23 is a cross-sectional view taken along the line I-I' of FIG. 22.

As illustrated in FIGS. 22 and 23, the first line L1, the second line L2, and the third line L3 of the first inspection line IL1 may be connected to each other.

For example, the first line L1 may be connected to the third line L3 through a first contact hole CNT1 of the gate insulating layer 311, and the second line L2 may be connected to the third line L3 through a second contact hole CNT2 of the gate insulating layer 311. As a more specific example, the pad portion L1-B of the first line L1 may be connected to the first pad portion L3-B1 of the third line L3 through the first contact hole CNT1, and the pad portion L2-B of the second line L2 may be connected to the second pad portion L3-B2 of the third line L3 through the second contact hole CNT2.

When the first line L1, the second line L2, and the third line L3 are connected in such a manner, the inspection signal transmitting capability of the first inspection line IL1 may be improved.

In an embodiment, other configurations of FIGS. 22 and 23 except for the first and second contact holes CNT1 and CNT2 are substantially the same as the configuration of FIGS. 3 and 4 described above.

Figure 24:
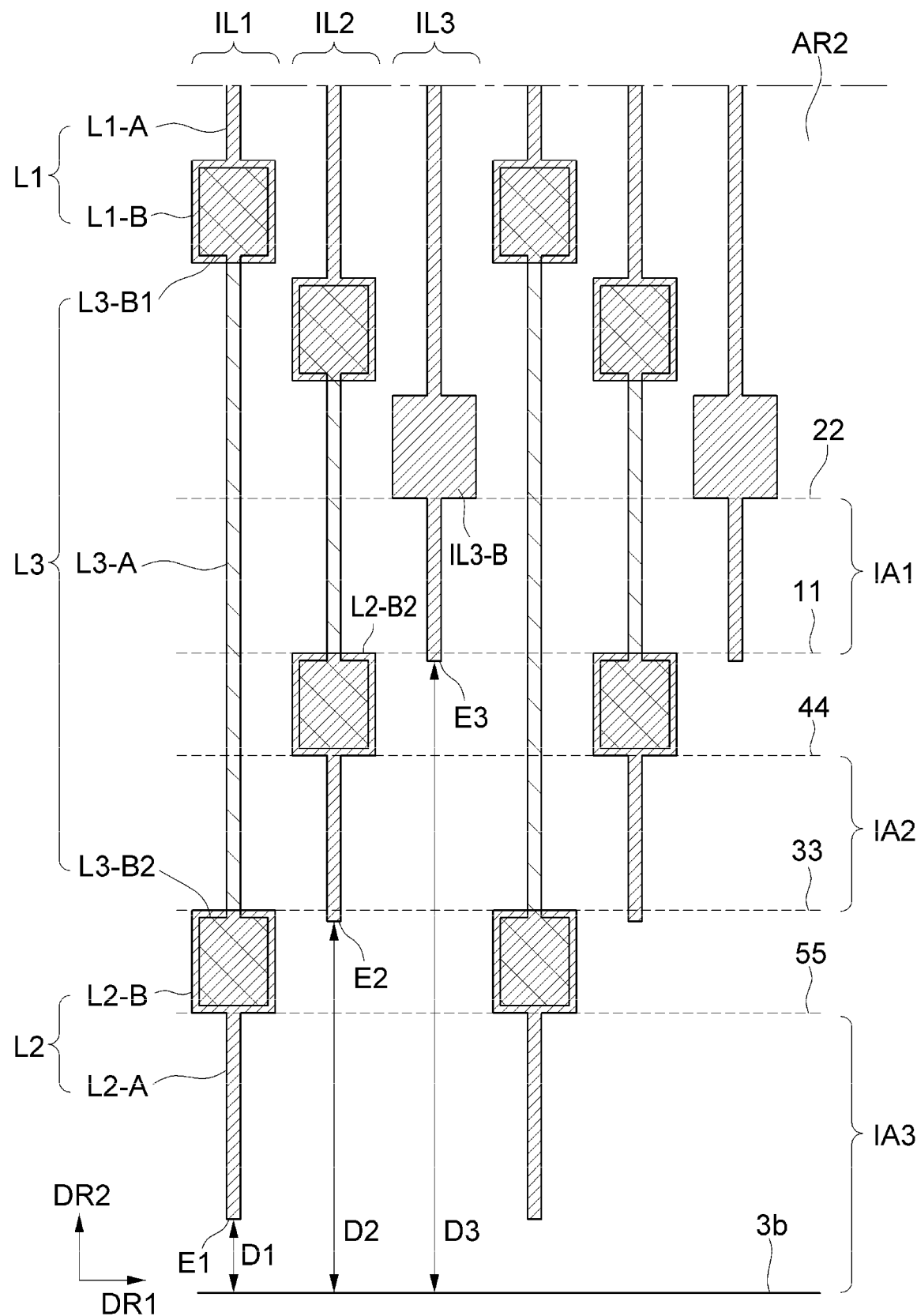
FIG. 24 is a plan view illustrating inspection lines according to another embodiment of the present disclosure.

FIG. 24 is a plan view illustrating inspection lines according to another embodiment of the present disclosure.

As illustrated in FIG. 24, three inspection lines adjacent to each other may form a group, and a plurality of groups including the three inspection lines may be repeatedly arranged along the first direction DR1. FIG. 24 shows an example in which two three-inspection-line groups are arranged along the first direction DR1.

The first inspection line IL1, the second inspection line IL2, and a third inspection line IL3 are arranged along the first direction DR1.

The first inspection area IA1, the second inspection area IA2, and a third inspection area IA3 are positioned in the non-display area AR2 of the substrate 301. The first inspection area IA1, the second inspection area IA2, and the third inspection area IA3 are sequentially arranged between the display area AR1 of the substrate 301 and the lower edge 3b of the substrate 301.

Among the first to third inspection areas IA1 to IA3, the first inspection area IA1 is positioned closest to the display area AR1, and the third inspection area IA3 is positioned closer to the lower edge 3b of the substrate 301 than to the display area AR1. The second inspection area IA2 is positioned between the first inspection area IA1 and the third inspection area IA3.

The first inspection area IA1 includes an area between the lowermost pad portion L2-B2 of the second inspection line IL2 and a lowermost pad portion IL3-B of the third inspection line IL3. Specifically, when facing surfaces of the lowermost pad portion L2-B2 of the second inspection line IL2 and the lowermost pad portion IL3-B of the third inspection line IL3 are defined as a first surface and a second surface, respectively, an area between a first imaginary parallel line 11 that is parallel to the first surface and passes through the first surface and a second imaginary parallel line 22 that is parallel to the second surface and passes through the second surface may be defined as the aforementioned first inspection area IA1.

In an embodiment, the first imaginary parallel line 11 may be defined as a line passing through each first surface of the lowermost pad portions L2-B2 of the second inspection lines IL2 adjacent to each other in the first direction DR1, and the second imaginary parallel line 22 may be defined as a line passing through each second surface of the lowermost pad portions IL3-B of the third inspection lines IL3 adjacent to each other in the first direction DR1.

The second inspection area IA2 includes an area between the lowermost pad portion L2-B of the first inspection line IL1 and the lowermost pad portion L2-B2 of the second inspection line IL2. Specifically, when facing surfaces of the lowermost pad portion L2-B of the first inspection line IL1 and the lowermost pad portion L2-B2 of the second inspection line IL2 are defined as a third surface and a fourth surface, respectively, an area between a third imaginary parallel line 33 that is parallel to the third surface and passes through the third surface and a fourth imaginary parallel line 44 that is parallel to the fourth surface and passes through the fourth surface may be defined as the aforementioned second inspection area IA2.

In an embodiment, the third imaginary parallel line 33 may be defined as a line passing through each third surface of the lowermost pad portions L2-B of the first inspection lines IL1 adjacent to each other in the first direction DR1, and the fourth imaginary parallel line 44 may be defined as a line passing through each fourth surface of the lowermost pad portions L2-B2 of the second inspection lines IL2 adjacent to each other in the first direction DR1.

The third inspection area IA3 is an inspection area of the three inspection areas IA1 to IA3 that is closest to the lower edge 3b of the substrate 301. The third inspection area IA3 includes an area between the lowermost pad portion L2-B of the first inspection line IL1 and the lower edge 3b of the substrate 301. Specifically, when a surface of the lowermost pad portion L2-B of the first inspection line IL1 that faces the lower edge 3b is defined as a fifth surface, an area between the lower edge 3b and a fifth imaginary parallel line 55 that is parallel to the fifth surface and passes through the fifth surface may be defined as the aforementioned third inspection area IA3.

In an embodiment, the fifth imaginary parallel line 55 may be defined as a line passing through each fifth surface of the lowermost pad portions L2-B of the first inspection lines IL1 adjacent to each other in the first direction DR1, The first inspection line IL1 overlaps all the inspection areas IA1 to IA3. In other words, the first inspection line IL1 extends toward the lower edge 3b of the substrate 301 and overlaps the first inspection area IA1, the second inspection area IA2, and the third inspection area IA3.

The second inspection line IL2 extends toward the lower edge 3b of the substrate 301 and overlaps the first inspection area IA1 and the second inspection area IA2. The second inspection line IL2 does not overlap the third inspection area IA3.

The third inspection line IL3 extends toward the lower edge 3b of the substrate 301 and overlaps only the first inspection area IA1. The third inspection line IL3 does not overlap the second inspection area IA2 or the third inspection area IA3. Accordingly, a distance D1 (hereinafter, "a first distance") from the lower edge 3b of the substrate 301 to the end E1 of the first inspection line IL1, a distance D2 (hereinafter, "a second distance") from the lower edge 3b of the substrate 301 to the end E2 of the second inspection line IL2, and a distance d3 (hereinafter, "a third distance") from the lower edge 3b of the substrate 301 to an end E3 of the third inspection line IL3 are different from each other. That is, the second distance D2 is greater than the first distance D1 and less than the third distance D3.

Two adjacent ones of the inspection lines in the first inspection area IA1 are positioned on different layers with respect to the gate insulating layer 311. For example, in the first inspection area IA1, the first and second inspection lines IL1 and IL2 are located below the gate insulating layer 311, and the third inspection line IL3 is located above the gate insulating layer 311. Accordingly, even though the first and second inspection lines IL1 and IL2 are positioned between the adjacent third inspection lines IL3 in the first inspection area IA1, the distance between the adjacent exposed inspection lines (i.e., adjacent third inspection lines IL3) in the first inspection area IA1 may be effectively increased because the first and second inspection lines IL1 and IL2 are covered by the gate insulating layer 311.

Two adjacent ones of the inspection lines in the second inspection area IA2 are positioned on different layers with respect to the gate insulating layer 311. For example, in the second inspection area IA2, the first inspection line IL1 is located below the gate insulating layer 311, and the second inspection line IL2 is located above the gate insulating layer 311. Accordingly, even though the first inspection line IL1 is positioned between the adjacent second inspection lines IL2 in the second inspection area IA2, the distance between the adjacent exposed inspection lines (i.e., adjacent second inspection lines IL2) in the second inspection area IA2 may be effectively increased because the first inspection line IL1 is covered by the gate insulating layer 311.

Only the first inspection line IL1 is present in the third inspection area IA3. That is, the first and second inspection lines IL1 and IL2 are not present in the third inspection area IA3. Accordingly, the distance between the adjacent inspection lines (i.e., first inspection lines IL1) in the third inspection area IA3 may be effectively increased.

As the inspection equipment 700 moves along the first inspection area IA1, the data lines respectively connected to the third inspection lines IL3 are inspected, and as the inspection equipment 700 moves along the second inspection area IA2 thereafter, the data lines respectively connected to the second inspection lines IL2 are inspected. Then, as the inspection equipment 700 moves along the third inspection area IA3, the data lines respectively connected to the first inspection lines IL1 are inspected.

In the embodiment illustrated in FIG. 24, the first inspection line IL1 and the second inspection line IL2 may have a configuration substantially the same as that of the first inspection line IL1 of FIG. 3 described above. In addition, the third inspection line IL3 of FIG. 24 may have a configuration substantially the same as that of the second inspection line IL2 of FIG. 3 described above.

As another embodiment, each of the first inspection line IL1 and the second inspection line IL2 of FIG. 24 may have a configuration substantially the same as that of the first inspection line IL1 of FIG. 22 described above.

Figure 25:
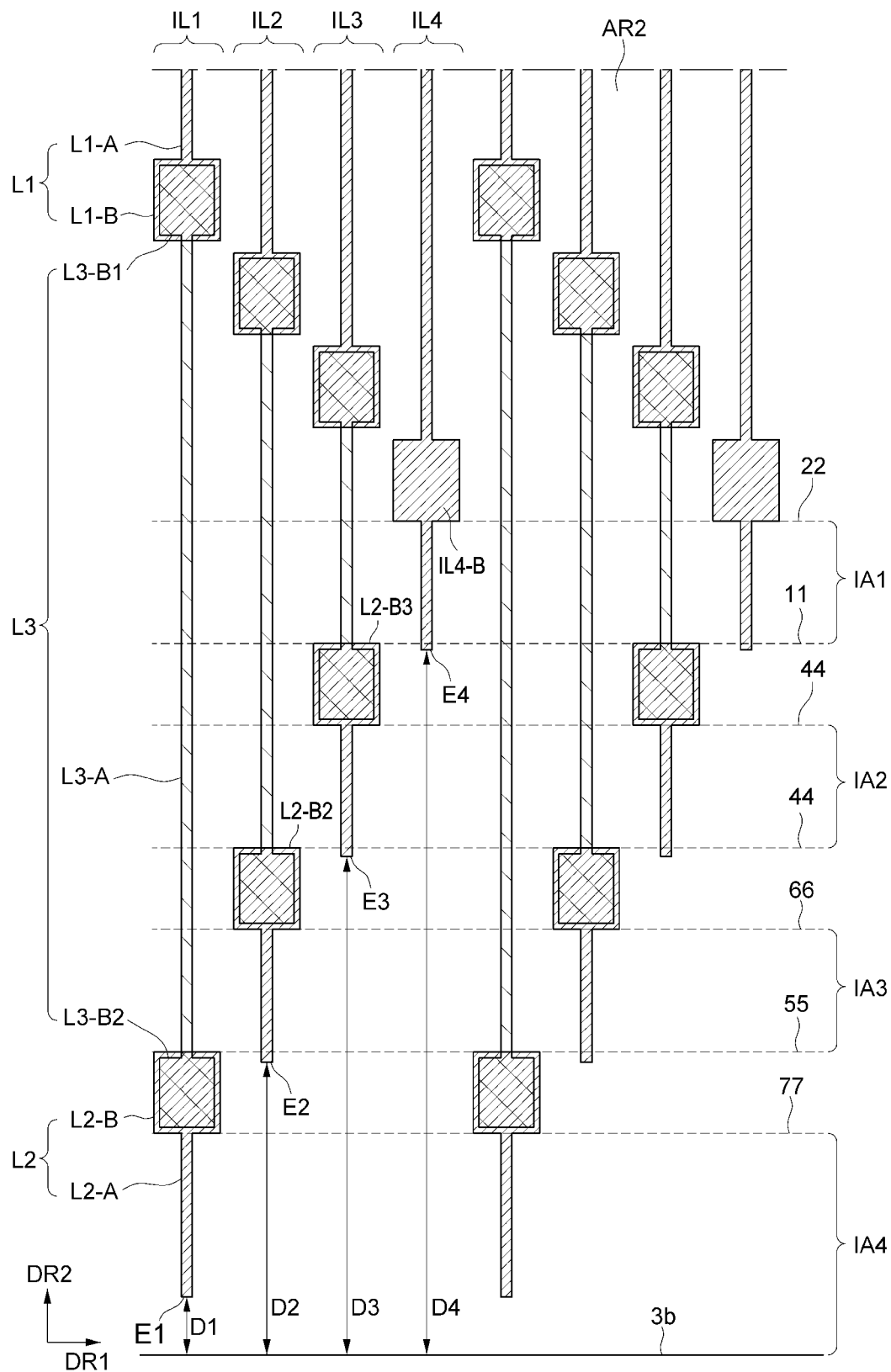
FIG. 25 is a plan view illustrating inspection lines according to another embodiment of the present disclosure.

FIG. 25 is a plan view illustrating inspection lines according to another embodiment of the present disclosure.

As illustrated in FIG. 25, four inspection lines adjacent to each other may form a group, and a plurality of groups including the four inspection lines may be repeatedly arranged along the first direction DR1. FIG. 25 shows an example in which two four-inspection-line groups are arranged along the first direction DR1.

The first inspection line IL1, the second inspection line IL2, the third inspection line IL3, and a fourth inspection line IL4 are arranged along the first direction DR1.

The first inspection area IA1, the second inspection area IA2, the third inspection area IA3, and a fourth inspection area IA4 are positioned in the non-display area AR2 of the substrate 301. The first inspection area IA1, the second inspection area IA2, the third inspection area IA3, and the fourth inspection area IA4 are disposed sequentially between the display area AR1 of the substrate 301 and the lower edge 3b of the substrate 301.

Among the first to fourth inspection areas IA1 to IA4, the first inspection area IA1 is positioned closest to the display area AR1, and the fourth inspection area IA4 is positioned closer to the lower edge 3b of the substrate 301 than to the display area AR1. The second inspection area IA2 is positioned between the first inspection area IA1 and the third inspection area IA3, and the third inspection area IA3 is positioned between the second inspection area IA2 and the fourth inspection area IA4.

The first inspection area IA1 includes an area between the lowermost pad portion L2-B3 of the third inspection line IL3 and a lowermost pad portion IL4-B of the fourth inspection line IL4. Specifically, when facing surfaces of the lowermost pad portion L2-B3 of the third inspection line IL3 and the lowermost pad portion IL4-B of the fourth inspection line IL4 are defined as a first surface and a second surface, respectively, an area between a first imaginary parallel line 11 that is parallel to the first surface and passes through the first surface and a second imaginary parallel line 22 that is parallel to the second surface and passes through the second surface may be defined as the aforementioned first inspection area IA1.

In an embodiment, the first imaginary parallel line 11 may be defined as a line passing through each first surface of the lowermost pad portions L2-B3 of the third inspection lines IL3 adjacent to each other in the first direction DR1, and the second imaginary parallel line 22 may be defined as a line passing through each second surface of the lowermost pad portions IL4-B of the fourth inspection lines IL4 adjacent to each other in the first direction DR1.

The second inspection area IA2 includes an area between the lowermost pad portion L2-B2 of the second inspection line IL2 and the lowermost pad portion L2-B3 of the third inspection line IL3. Specifically, when facing surfaces of the lowermost pad portion L2-B2 of the second inspection line IL2 and the lowermost pad portion L2-B3 of the third inspection line IL3 are defined as a third surface and a fourth surface, respectively, an area between a third imaginary parallel line 33 that is parallel to the third surface and passes through the third surface and a fourth imaginary parallel line 44 that is parallel to the fourth surface and passes through the fourth surface may be defined as the aforementioned second inspection area IA2.

In an embodiment, the third imaginary parallel line 33 may be defined as a line passing through each third surface of the lowermost pad portions L2-B2 of the second inspection lines IL2 adjacent to each other in the first direction DR1, and the fourth imaginary parallel line 44 may be defined as a line passing through each fourth surface of the lowermost pad portions L2-B3 of the third inspection lines IL3 adjacent to each other in the first direction DR1.

The third inspection area IA3 includes an area between the lowermost pad portion L2-B of the first inspection line IL1 and the lowermost pad portion L2-B2 of the second inspection line IL2. Specifically, when facing surfaces of the lowermost pad portion L2-B of the first inspection line IL1 and the lowermost pad portion L2-B2 of the second inspection line IL2 are defined as a fifth surface and a sixth surface, respectively, an area between a fifth imaginary parallel line 55 that is parallel to the fifth surface and passes through the fifth surface and a sixth imaginary parallel line 66 that is parallel to the sixth surface and passes through the sixth surface may be defined as the aforementioned third inspection area IA3.

In an embodiment, the fifth imaginary parallel line 55 may be defined as a line passing through each fifth surface of the lowermost pad portions L2-B of the first inspection lines IL1 adjacent to each other in the first direction DR1, and the sixth imaginary parallel line 66 may be defined as a line passing through each sixth surface of the lowermost pad portions L2-B2 of the second inspection lines IL2 adjacent to each other in the first direction DR1.

The fourth inspection area IA4 of the first to fourth inspection areas IA1 to IA4 is the inspection area closest to the lower edge 3b of the substrate 301, and the fourth inspection area IA4 includes an area between the lowermost pad portion L2-B of the first inspection line IL1 and the lower edge 3b of the substrate 301. Specifically, when a surface of the lowermost pad portion L2-B of the first inspection line IL1 that faces the lower edge 3b is defined as a seventh surface, an area between the lower edge 3b and a seventh imaginary parallel line 77 that is parallel to the seventh surface and passes through the seventh surface may be defined as the aforementioned fourth inspection area IA4.

The first inspection line IL1 overlaps all the inspection areas IA1 to IA4. In other words, the first inspection line IL1 extends toward the lower edge 3b of the substrate 301 and overlaps the first inspection area IA1, the second inspection area IA2, the third inspection area IA3, and the fourth inspection area IA4.

The second inspection line IL2 extends toward the lower edge 3b of the substrate 301 and overlaps the first inspection area IA1, the second inspection area IA2, and the third inspection area IA3. The second inspection line IL2 does not overlap the fourth inspection area IA4.

The third inspection line IL3 extends toward the lower edge 3b of the substrate 301 and overlaps the first inspection area IA1 and the second inspection area IA2. The third inspection line IL3 does not overlap the third and fourth inspection areas IA3 and IA4.

The fourth inspection line IL4 extends toward the lower edge 3b of the substrate 301 and overlaps only the first inspection area IA1. The fourth inspection line IL4 does not overlap the second to fourth inspection areas IA2 to IA4. Accordingly, a distance D1 (hereinafter, "a first distance") from the lower edge 3b of the substrate 301 to the end E1 of the first inspection line IL1, a distance D2 (hereinafter, "a second distance") from the lower edge 3b of the substrate 301 to the end E2 of the second inspection line IL2, a distance d3 (hereinafter, "a third distance") from the lower edge 3b of the substrate 301 to the end E3 of the third inspection line IL3, and a distance d4 (hereinafter, "a fourth distance") from the lower edge 3b of the substrate 301 to an end E4 of the fourth inspection line IL4 are different from each other. That is, the fourth distance D4, the third distance D3, the second distance D2, and the first distance D1 are in the order of the length.

Two adjacent ones of the inspection lines in the first inspection area IA1 are positioned on different layers with respect to the gate insulating layer 311. For example, in the first inspection area IA1, the first to third inspection lines IL1 to IL3 are located below the gate insulating layer 311, and the fourth inspection line IL4 is located above the gate insulating layer 311. Accordingly, even though the first to third inspection lines IL1 to IL3 are positioned between the adjacent fourth inspection lines IL4 in the first inspection area IA1, the distance between the adjacent exposed inspection lines (i.e., fourth inspection lines IL4) in the first inspection area IA1 may be effectively increase because the first to third inspection lines IL1 to IL3 are covered by the gate insulating layer 311.

Two adjacent ones of the inspection lines in the second inspection area IA2 are positioned on different layers with respect to the gate insulating layer 311. For example, in the second inspection area IA2, the first and second inspection lines IL1 and IL2 are located below the gate insulating layer 311, and the third inspection line IL3 is located above the gate insulating layer 311. Accordingly, even though the first and second inspection lines IL1 and IL2 are positioned between the adjacent third inspection lines IL3 in the second inspection area IA2, the distance between the adjacent exposed inspection lines (i.e., third inspection lines IL3) in the second inspection area IA2 may be effectively increased because the first and second inspection lines IL1 and IL2 are covered by the gate insulating layer 311.

Two adjacent ones of the inspection lines in the third inspection area IA3 are positioned on different layers with respect to the gate insulating layer 311. For example, in the third inspection area IA3, the first inspection line IL1 is located below the gate insulating layer 311, and the second inspection line IL2 is located above the gate insulating layer 311. Accordingly, even though the first inspection line IL1 is positioned between the adjacent second inspection lines IL2 in the third inspection area IA3, the distance between the adjacent exposed inspection lines (i.e., second inspection lines IL2) in the third inspection area IA3 may be effectively increased because the first inspection line IL1 is covered by the gate insulating layer 311.

Only the first inspection line IL1 is present in the fourth inspection area IA4. That is, the first to third inspection lines IL1 to IL3 are not present in the fourth inspection area IA4. Accordingly, the distance between the adjacent inspection lines (i.e., first inspection lines IL1) in the fourth inspection area IA4 may be effectively increased.

As the inspection equipment 700 moves along the first inspection area IA1, the data lines respectively connected to the fourth inspection lines IL4 are inspected, and as the inspection equipment 700 moves along the second inspection area IA2 thereafter, the data lines respectively connected to the third inspection lines IL3 are inspected. Then, as the inspection equipment 700 moves along the third inspection area IA3, the data lines respectively connected to the second inspection lines IL2 are inspected, and as the inspection equipment 700 then moves along the fourth inspection area IA4, the data lines respectively connected to the first inspection lines IL1 are inspected.

In the embodiment illustrated in FIG. 25, the first to third inspection lines IL1 to IL3 may have a configuration substantially the same as that of the first inspection line IL1 of FIG. 3 described above. In addition, the fourth inspection line IL4 of FIG. 25 may have a configuration substantially the same as that of the second inspection line IL2 of FIG. 3 described above.

As another embodiment, each of the first to third inspection lines IL1 to IL3 of FIG. 25 may have a configuration substantially the same as that of the first inspection line IL1 of FIG. 22 described above.

In an embodiment, the display device of the present disclosure may include various embodiments in addition to the embodiments of FIGS. 3, 24, and 25 described above. For example, the number of inspection lines in a group may be five or more.

Hereinafter, a generalized structure that may include all the embodiments including the embodiments of FIGS. 3, 24, and 25 will be described.

The substrate 301 may include first through n-th inspection areas positioned in the non-display area AR2, where n is a natural number larger than one.

The first to n-th inspection areas are arranged sequentially from the first area between the display area and the lower edge 3b of the substrate 301. The first inspection area IA1 is closest to the display area, and the n-th inspection area is closest to the lower edge 3b of the substrate 301.

First to n-th inspection lines arranged along the first direction DR1 may form a group. The first to n-th inspection lines are positioned in the non-display area AR2, and they are connected to the first to n-th data lines, respectively.

The first inspection line IL1 extends toward the lower edge 3b of the substrate 301 and overlaps the first to n-th inspection areas. That is, the first inspection line IL1 overlaps all the inspection areas irrespective of the number of inspection areas.

A p-th inspection line that is one of the inspection lines other than the first inspection line IL1 extends toward the lower edge 3b of the substrate 301 and overlaps the first to (n−p+1)-th inspection areas, where p is a natural number larger than 1 and less than or equal to n.

Two adjacent inspection lines adjacent to each other in a q-th inspection area are positioned on different layers with respect to the gate insulating layer 311 interposed therebetween, where q is a natural number less than n.

An (n−q)-th inspection line and an (n−q+1)-th inspection line in the q-th inspection area are positioned on different layers with respect to the gate insulating layer 311.

In the q-th inspection area, the first to (n−q)-th inspection lines are positioned on a substantially same layer with respect to the gate insulating layer 311.

The q-th inspection area includes an area between a lowermost pad portion of the (n−q+1)-th inspection line and the lowermost pad portion of the (n−q)-th inspection line. In addition, the q-th inspection area may include an area between two imaginary parallel lines that pass through facing surfaces of the lowermost pad portion of the (n−q+1)-th inspection line and the lowermost pad portion of the (n−q)-th inspection line, respectively.

The n-th inspection area includes an area between the lowermost pad portion of the first inspection line IL1 and the lower edge 3b of the substrate 301.

The intervals between the edge of the substrate 301 and each of the first to n-th ends of the first to n-th inspection lines are different from each other. For example, the distance between the end of the p-th inspection line and the lower edge 3b of the substrate 301 is larger than the distance between the end of the (p−1)-th inspection line and the lower edge 3b of the substrate 301.

Figure 26:
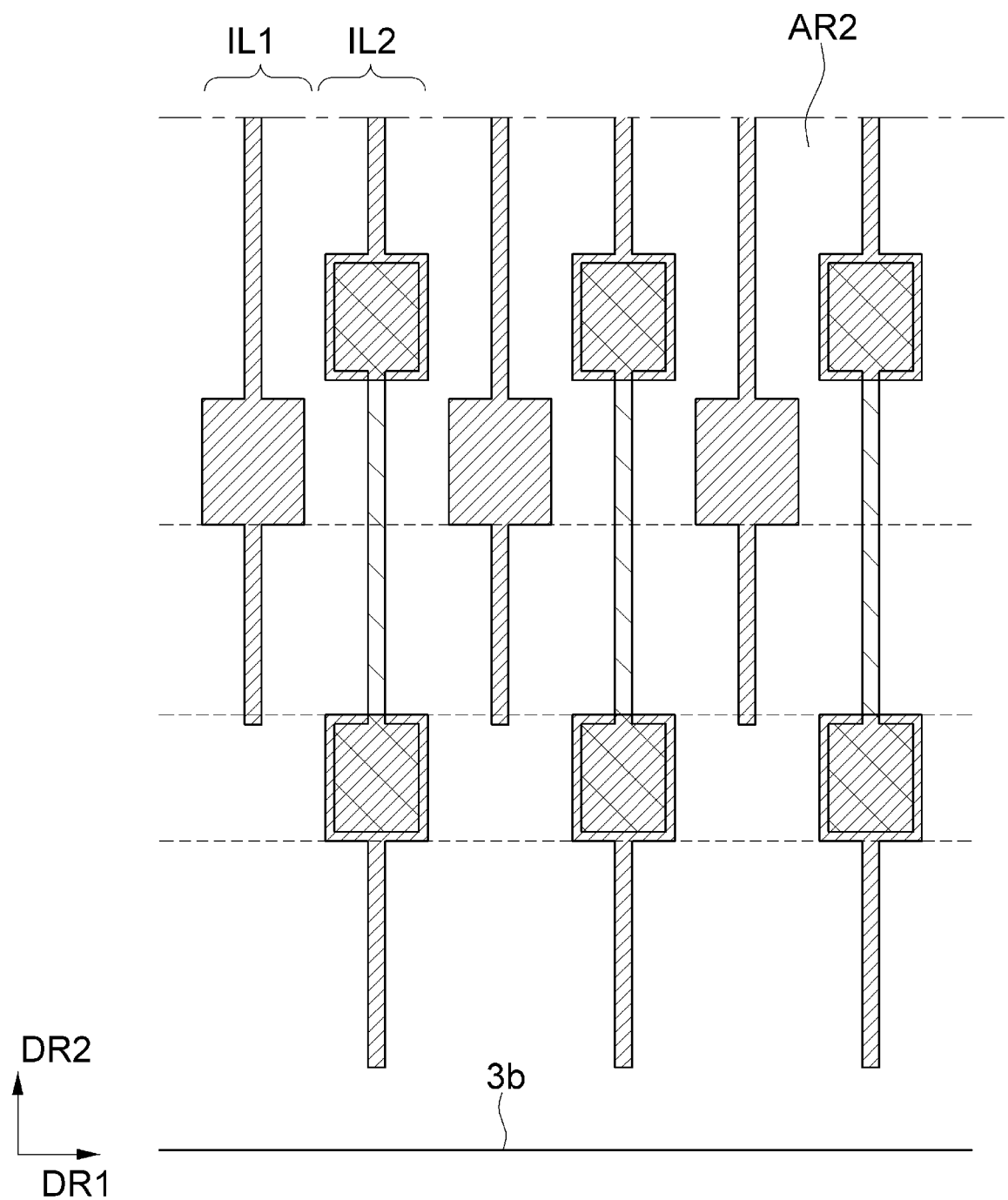
FIG. 26 is a plan view illustrating inspection lines according to another embodiment of the present disclosure.

FIG. 26 is a plan view illustrating inspection lines according to another embodiment of the present disclosure.

The disposition structure of the inspection lines is symmetric to the disposition structure of the inspection lines of FIG. 3 described above.

The first inspection line IL1 of FIG. 26 is substantially the same as the second inspection line IL2 of FIG. 3.

The second inspection line IL2 of FIG. 26 is substantially the same as the first inspection line IL1 of FIG. 3.

Although not illustrated, the inspection lines of FIGS. 24 and 25 described above may also have a symmetrical shape as illustrated in FIG. 26.

Figure 27:
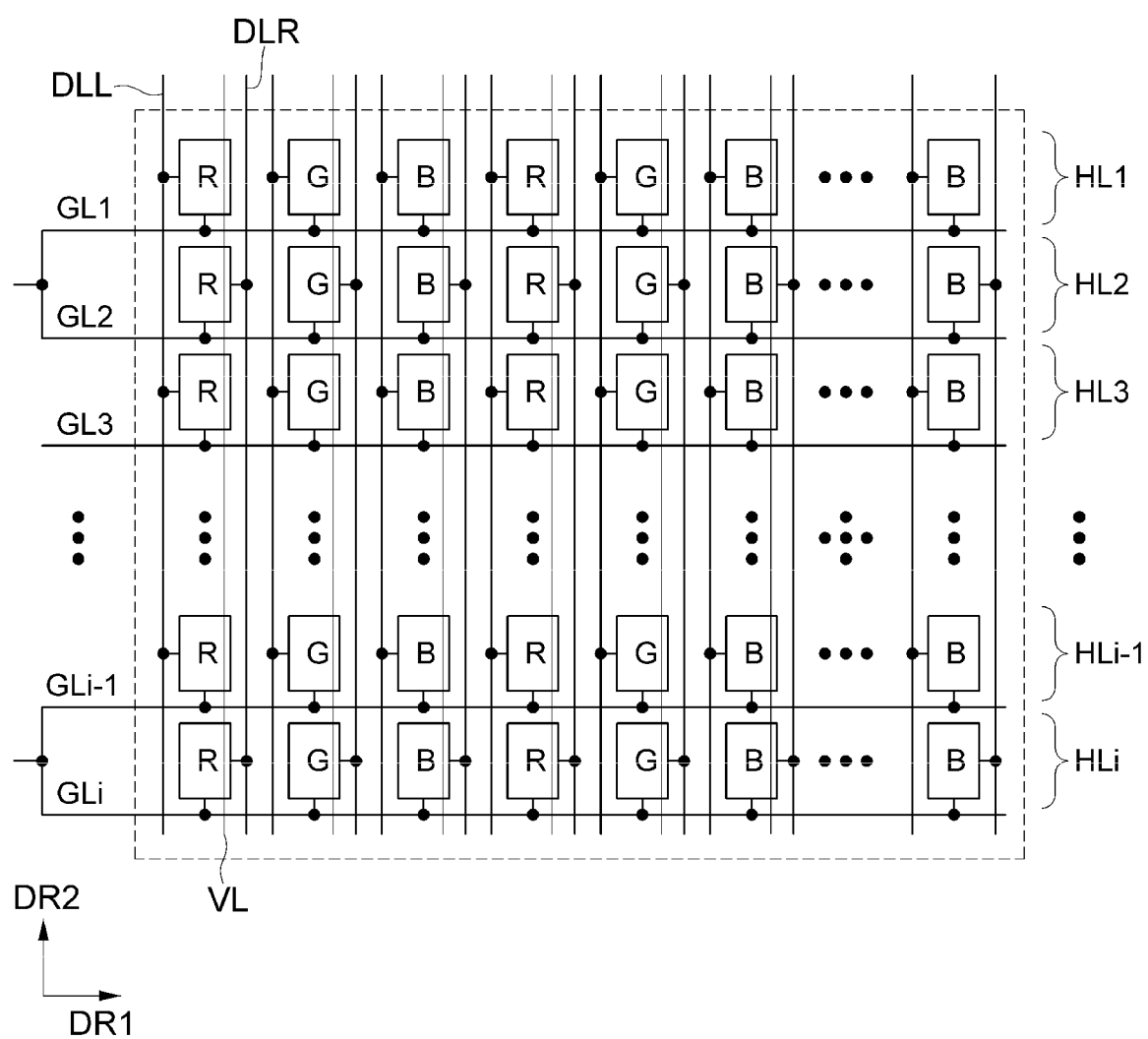
FIG. 27 is a view illustrating another structure of a display area of a display device according to an embodiment of the present disclosure.

FIG. 27 is a view illustrating another structure of a display area of a display device according to an embodiment of the present disclosure.

A plurality of pixels R, G, and B may be disposed in the display area of the substrate 301 in the manner as illustrated in FIG. 27.

For example, pixels positioned in odd-numbered horizontal lines HL1, HL3, . . . , and HLi−1 are connected to data lines DLL positioned on the left side thereof, respectively, and pixels positioned in even-numbered horizontal lines HL2, HL4, . . . , HLi are connected to data lines DLR positioned on the right side thereof, respectively.

In an embodiment, a (2y−1)-th gate line and a 2y-th gate line are connected to each other, wherein y is a natural number. For example, the first gate line GL1 and the second gate line GL2 are connected to each other, and the third gate line GL3 and the fourth gate line are connected to each other.

The number of the data lines DLL and DLR arranged in the display area AR1 of FIG. 27 is larger than the number of the data lines DL1 to DLj arranged in the display area AR1 of FIG. 2. For example, the number of the data lines DLL and DLR in the display area AR1 of FIG. 27 may be twice the number of the data lines DL1 to DLj of the display area AR1 of FIG. 2. Accordingly, the number of inspection lines connected to the data lines DLL and DLR of FIG. 27 is larger than the number of inspection lines IL1 and IL2 connected to the data lines DL1 to DLj of FIG. 2. Accordingly, the interval between the inspection lines of FIG. 27 may be narrower than the interval between the inspection lines IL1 and IL2 of FIG. 3.

Even if a considerably large number of data lines DLL and DLR are arranged as illustrated in FIG. 27, the large number of data lines DLL and DLR may be easily inspected using the inspection line structure illustrated in one of FIGS. 3, 24, and 25 because the intervals between adjacent exposed inspection lines are sufficiently spaced apart, avoiding an inspection error of contacting two or more inspection lines at a time during an inspection process.

In the embodiment illustrated in FIG. 27, the display device according to an embodiment of the present disclosure may further include a plurality of sustaining lines VL. These sustaining lines VL are connected in common to pixels that are vertically positioned. The sustaining line VL applies a sustain voltage (e.g., a DC voltage) to the pixel. These sustaining lines VL and the data lines DLL and DLR include a substantially same material and are positioned on a substantially same layer.

The data lines DLL and DLR and the sustaining line VL may be alternately arranged along the first direction DR1.

A defect inspection on the sustaining lines VL may be performed with a defect inspection on the data lines DLL and DLR. That is, the sustaining lines VL and the data lines DLL and DLR are inspected together by the inspection method described above. To this end, the inspection lines respectively connected to the sustaining lines VL may be further disposed in the non-display area AR2. The data line and the sustaining line adjacent to each other may form the aforementioned pair (or group).

Even when a considerably large number of data lines DLL and DLR and sustaining lines VL are arranged as illustrated in FIG. 27, the large number of data lines DLL and DLR and the sustaining line VL may also be easily inspected using the inspection structure as illustrated in one of FIGS. 3, 24 and 25 because the intervals between adjacent exposed inspection lines are sufficiently spaced apart, avoiding an inspection error of contacting two or more inspection lines at a time during an inspection process.

Figure 28:
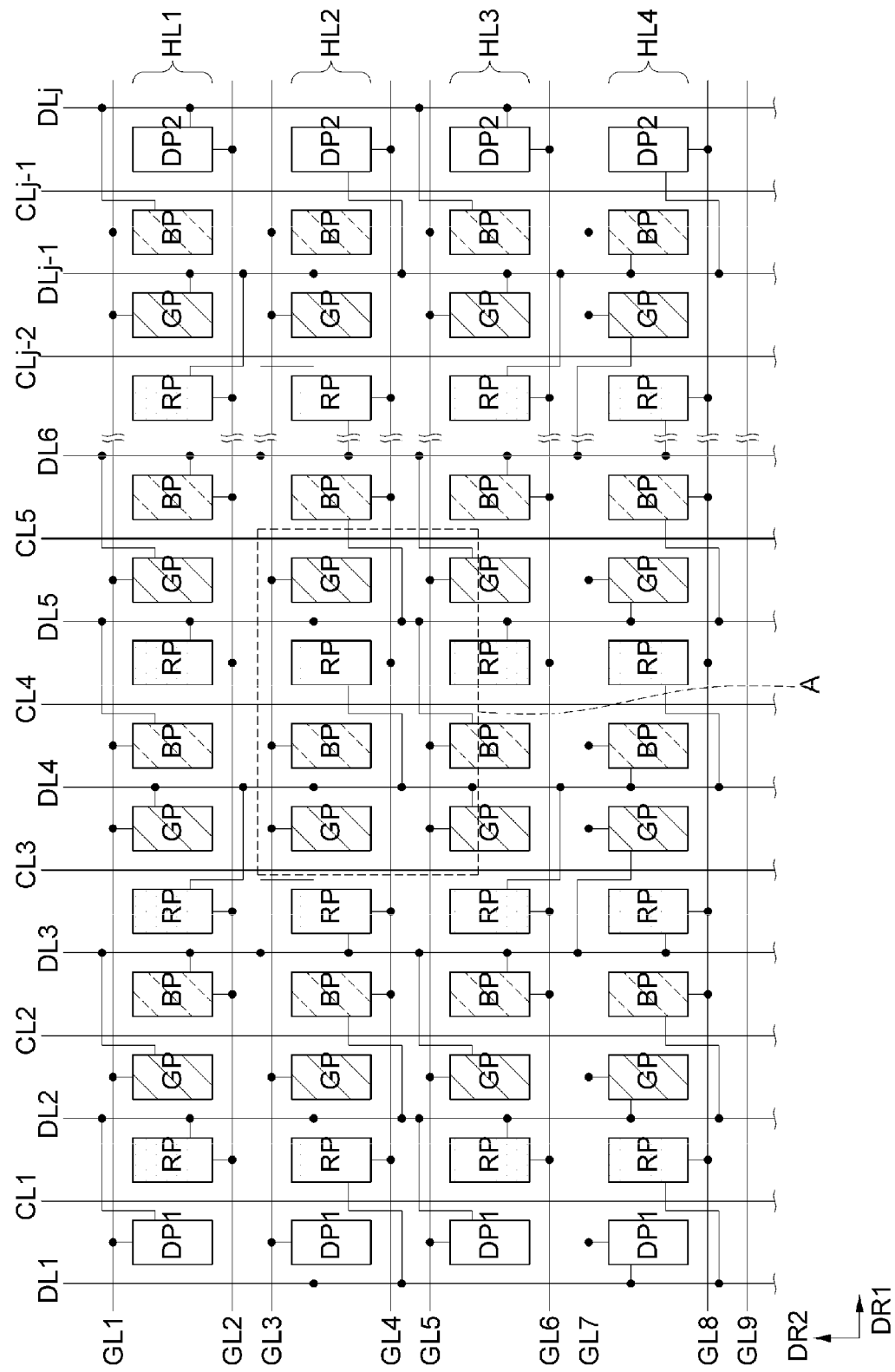
FIG. 28 is a view illustrating another structure of a display area of a display device according to an embodiment of the present disclosure.

FIG. 28 is a view illustrating another structure of a display area of a display device according to an embodiment of the present disclosure.

As illustrated in FIG. 28, a plurality of gate lines GL1 to GL9, a plurality of data lines DL1 to DLj, a plurality of common lines CL1 to CLj−1, a plurality of pixels RP, GP, and BP, a plurality of first dummy pixels DP1, and a plurality of second dummy pixels DP2 may be disposed in a display area of the display device according to the present embodiment of the present disclosure.

The plurality of pixels include a red pixel RP displaying a red image, a green pixel GP displaying a green image, a blue pixel BP displaying a blue image, a first dummy pixel DP1, and a second dummy pixel DP2.

Although not illustrated in FIG. 28, each of the pixels DP1, RP, GP, BP, and DP2 includes at least one switching element and a pixel electrode connected to the switching element. Each switching element is connected to the corresponding gate line and the corresponding data line, and FIG. 28 shows the gate line and the data line that are connected to the switching element of each pixel. In other words, FIG. 28 shows the electrical connection relationship between the switching element and the gate line of each pixel and the electrical connection relationship between the switching element and the data line of each pixel. For example, the switching element included in the first dummy pixel of the pixels of the first horizontal line HL1 are connected to the first gate line and the second data line.

In the embodiment of FIG. 28, the position of a pixel substantially corresponds to a position of the pixel electrode that is disposed between the constituent elements included in the pixel. For example, among the pixels of the second horizontal line HL2, the first red pixel RP that is connected to the first data line DL1 is positioned between the third gate line GL3 and the fourth gate line GL4. However, the switching element of the first red pixel RP is not positioned between the third gate line GL3 and the fourth gate line GL4. Hereinafter, the position of the pixel (or the dummy pixel) in the description of FIG. 28 refers to the position of the pixel electrode between the constituent elements of the pixel. For example, in the description related to FIG. 28, the phrase that "a pixel is positioned between the first gate line GL1 and the second gate line GL2" implies that "a pixel electrode of the pixel is positioned between the first gate line GL1 and the second gate line GL2." Similarly, the phrase that "a pixel is positioned between the first data line DL1 and the first common line CL1" implies that "a pixel electrode of the pixel is positioned between the first data line DL1 and the first common line CL1."

Each of the dummy pixels DP1 and DP2 may be a pixel for displaying a blue color. The first dummy pixel DP1 is positioned at a leftmost position in each horizontal line. The second dummy pixel DP2 is positioned at a rightmost position in each horizontal line. The first dummy pixels DP1 and the second dummy pixels DP2 are covered by a light blocking layer (e.g., the light blocking layer 376 shown in FIG. 30).

The first dummy pixel DP1 is positioned between the first data line DL1 that is positioned at a leftmost position among the plurality of data lines DL1 to DLj and the first common line CL1 that is positioned at a leftmost position among the plurality of common lines CL1 to CLj−1. The pixel electrode of the second dummy pixel DP2 is positioned between the j-th data line DLj that is positioned at a rightmost position among the plurality of data lines DL1 to DLj and the (j−1)-th common line CLj−1 that is positioned at a rightmost position among the plurality of common lines CL1 to CLj−1.

The pixels DP1, RP, GP, BP, and DP2 arranged along a k-th horizontal line are positioned between the (2k−1)-th gate line and the 2k-th gate line, where k is a natural number. For example, the pixels arranged along the third horizontal line HL3 are positioned between the fifth gate line GL5 and the sixth gate line GL6.

Each of the common lines CL1 to CLj−1 is positioned between adjacent data lines. For example, the first common line CL1 is positioned between the first data line DL1 and the second data line DL2. Each of the common lines CL1 to CLj−1 transmits a common voltage. The common lines CL1 to CLj−1 are connected to a common electrode (e.g., the common electrode 330 show in FIG. 30). The common voltage from the common lines CL1 to CLj−1 is applied to the common electrode.

Each of the pixels DP1, RP, GP, BP, and DP2 is positioned in an area surrounded by two gate lines, a data line, and a common line. For example, among the pixels DP1, RP, GP, BP, and DP2 arranged in the first horizontal line HL1, a red pixel RP connected to the second data line DL2 is positioned in an area surrounded by the first gate line GL1, the second gate line GL2, the first common line CL1, and the second data line DL2.

The red pixel RP is connected to one of two gate lines located below the red pixel RP that is closer to the pixel electrode of the red pixel RP than the other of the two gate lines. For example, the red pixel RP in the third horizontal line HL3 is connected to the sixth gate line GL6 that is closer to the pixel electrode of the red pixel RP between the sixth and seventh gate lines GL6 and GL7 located below the red pixel RP. However, since only one gate line is located below the red pixel RP arranged in the last horizontal line, the red pixel of the last horizontal line is connected to the one gate line.

The green pixel GP is connected to one of two gate lines located above the green pixel GP that is closer to the pixel electrode of the green pixel GP than the other of the two gate lines. For example, the green pixel GP in the third horizontal line HL3 is connected to the fifth gate line GL5 that is closer to the pixel electrode of the green pixel GP between the fourth and fifth gate lines GL4 and GL5 located above the green pixel GP. However, since only one gate line GL1 is located above the green pixel GP arranged in the first horizontal line HL1, the green pixel of the first horizontal line HL1 is connected to the one gate line GL1.

The blue pixel BP is connected to one of two gate lines located below the blue pixel BP that is closer to the pixel electrode of the blue pixel BP than the other of the two gate lines, or to one of two gate lines located above the blue pixel BP that is closer to the pixel electrode of the blue pixel BP than the other of the two gate lines. For example, one of the blue pixels BP in the third horizontal line HL3 is connected to the sixth gate line GL6 that is closer to the pixel electrode of the blue pixel BP between the sixth and seventh gate lines GL6 and GL7 located below the blue pixel BP. On the other hand, another of the blue pixels BP in the third horizontal line HL3 is connected to the fifth gate line GL5 that is closer to the pixel electrode of the blue pixel BP between the fourth and fifth gate lines GL4 and GL5 located above the blue pixel BP.

Each of the pixels DPI, RP, GP, BP, and DP2 arranged along the odd-numbered horizontal lines HL1, HL3, . . . is connected to one of the two data lines positioned on the right side of the corresponding pixel that is closest to the corresponding pixel. For example, a leftmost one of the green pixels GP in the third horizontal line HL3 is connected to the third data line DL3 that is closest to the leftmost one of the green pixels GP between the data lines positioned on the right side of the leftmost one of the green pixels GP.

Each of the pixels DP1, RP, GP, BP, and DP2 arranged along the even-numbered horizontal lines HL2, HL4, . . . is connected to one of the two data lines positioned on the left side of the corresponding pixel that is closest to the corresponding pixel. For example, a leftmost one of the green pixels GP in the fourth horizontal line HL4 is connected to the second data line DL2 that is closest to the leftmost one of the green pixels GP between the data lines positioned on the left side of the leftmost one of the green pixels GP.

Figure 29:
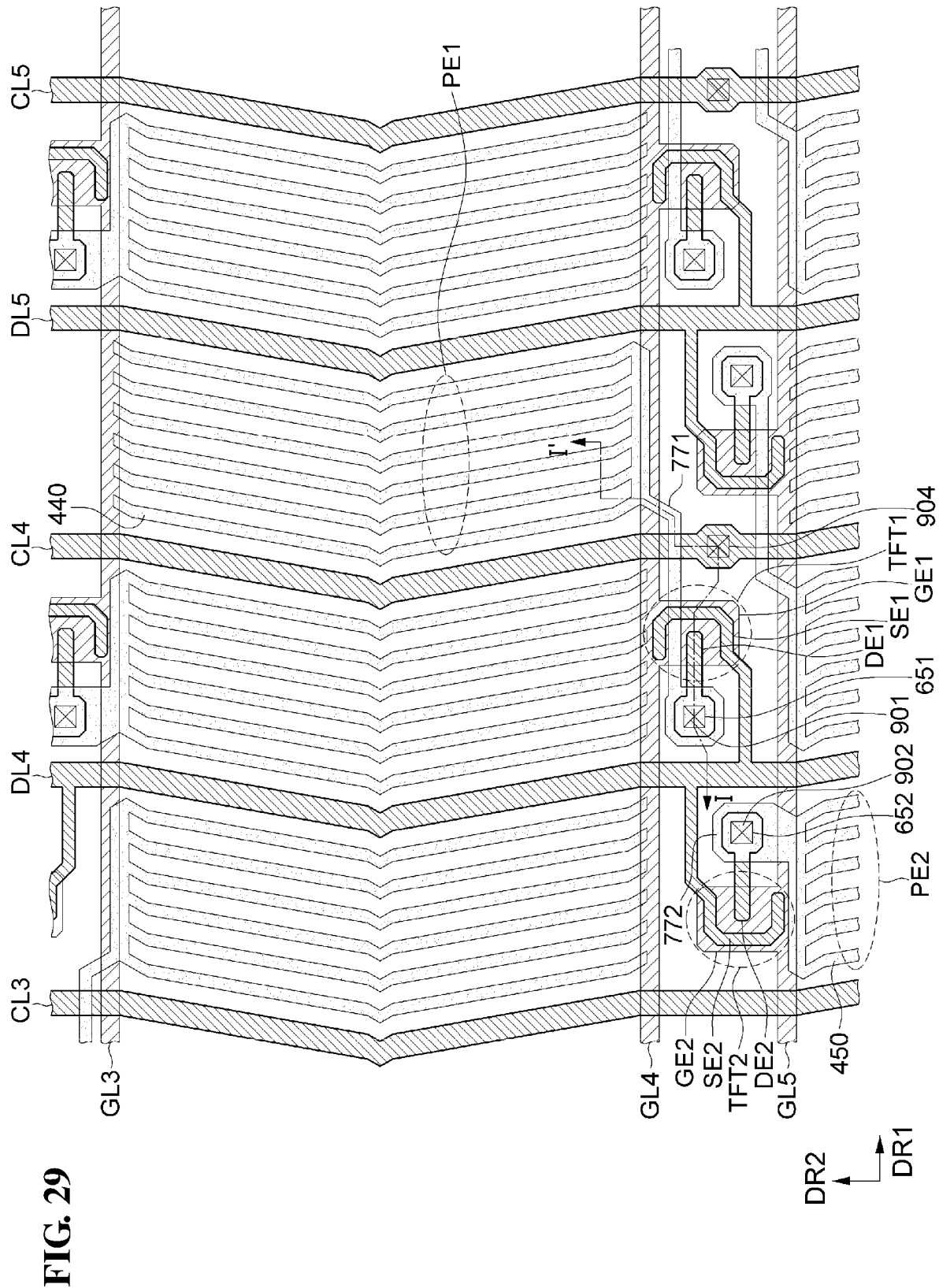
FIG. 29 is a detailed view illustrating portion A of FIG. 28.
Figure 30:
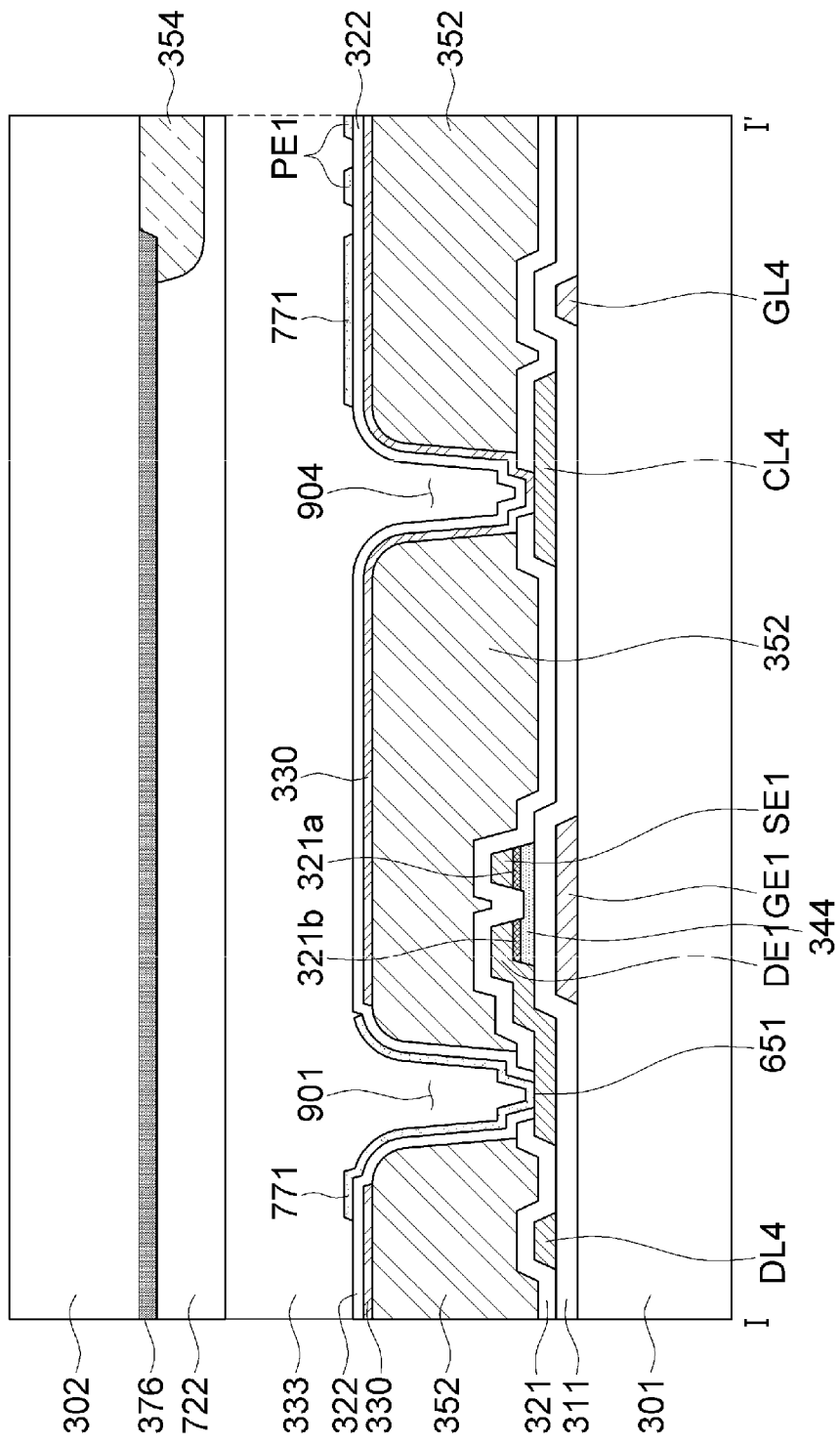
FIG. 30 is a cross-sectional view taken along the line I-I' of FIG. 29.

FIG. 29 is a detailed view illustrating portion A of FIG. 28, and FIG. 30 is a cross-sectional view taken along the line I-I' of FIG. 29.

Among the pixels in portion A of FIG. 28, the red pixel RP in the second horizontal line HL2 is defined as a first pixel. In addition, among the pixels in portion A, the green pixel GP positioned in the third horizontal line HL3 and connected to the fourth data line DL4 is defined as a second pixel.

As illustrated in FIGS. 29 and 30, the display device includes a first substrate 301, a plurality of gate lines GL3, GL4, and GL5, a plurality of gate electrodes GE1 and GE2, a gate insulating layer 311, a plurality of data lines DL4 and DL5, a plurality of source electrodes SE1 and SE2, a plurality of drain electrodes DE1 and DE2, a plurality of common lines CL3, CL4, and CL5, a first protective layer 321, an insulating interlayer 352, a plurality of pixel electrodes PE1 and PE2, a second protective layer 322, a common electrode 330, a second substrate 302, a light blocking layer 376, a color filter 354, and a liquid crystal layer 333.

The first pixel includes a first switching element TFT1 and a first pixel electrode PE1 as illustrated in FIGS. 29 and 30.

The first switching element TFT1 is disposed in an area (switching element area) surrounded by the fourth gate line GL4, the fifth gate line GL5, the fourth data line DL4 and the fourth common line CL4. The first switching element TFT1 may be a thin film transistor.

The first switching element TFT1 includes a first gate electrode GE1, a first source electrode SE1, and a first drain electrode DE1. The first gate electrode GE1 is connected to the fourth gate line GL4, the first source electrode SE1 is connected to the fourth data line DL4, the first drain electrode DE1 is connected to the first pixel electrode PE1.

The first gate electrode GE1 and the fourth gate line GL4 may be integrally formed into a unitary structure. The first gate electrode GE1 may have a shape protruding from the fourth gate line GL4 toward the fifth gate line GL5. The fifth gate line GL5 is positioned closest to the fourth gate line GL4 among the plurality of gate lines.

An end portion of the fourth gate line GL4 may be connected to another layer or an external driving circuit. The end portion of the fourth gate line GL4 may have an area larger than an area of another portion of the fourth gate line GL4.

The first source electrode SE1 and the fourth data line DL4 may be integrally formed into a unitary structure. The first source electrode SE1 may have a shape protruding from the fourth data line DL4 toward the first gate electrode GE1.

The first pixel electrode PE1 is disposed in an area (pixel electrode area) surrounded by the third gate line GL3, the fourth gate line GL4, the fourth common line CL4, and the fifth data line DL5.

The first pixel electrode PE1 may include a plurality of branch electrodes 440 spaced apart from each other, as illustrated in FIG. 29. One side of each branch electrode 440 is connected to a first connection electrode 771. Each branch electrode 440 overlaps gate lines adjacent thereto. For example, an end of each branch electrode 440 of the first pixel electrode PE1 overlaps the third gate line GL3 and the fourth gate line GL4. A storage capacitor is formed at an overlap portion between each branch electrode 440 and the gate lines GL3 and GL4.

The first pixel electrode PE1 is connected to the first switching element TFT1. Specifically, the first pixel electrode PE1 is connected to the first drain electrode DE1 of the first switching element TFT1. The first pixel electrode PE1 and the first drain electrode DE1 may be connected to each other by the first connection electrode 771. The first connection electrode 771 extends from the first pixel electrode PE1 to an area above the first drain electrode DE1. As illustrated in FIG. 29, the first connection electrode 771 and the first pixel electrode PE1 are integrally formed into a unitary structure. The first connection electrode 771 may correspond to a part of the first pixel electrode PE1.

The first connection electrode 771 overlaps at least a portion of the fourth common line CL4 and the fourth gate line GL4.

A connection portion between the first pixel electrode PE1 and the first drain electrode DE1 of the first switching device TFT1 is defined as a first connection portion 651. As illustrated in FIGS. 29 and 30, the first connection portion 651 refers to a contact interface between the first drain electrode DE1 and the first pixel electrode PE1. The first pixel electrode PE1 may physically contact the first drain electrode DE1 through a first drain contact hole 901 that penetrates through the first protective layer 321, the insulating interlayer 352, and the second protective layer 322.

The first connection portion 651 may be disposed between the fourth data line DL4 and the first gate electrode GE1, as illustrated in FIG. 29. More specifically, the first connection portion 651 may be disposed in an area surrounded by the fourth data line DL4, the first gate electrode GE1, the fourth gate line GL4, and the first source electrode SE1.

The position of the first drain contact hole 901 may be substantially the same as the position of the first connection portion 651 described above.

The vertical relationship of the constituent elements of the first pixel will be described in detail with reference to FIG. 30.

The fourth gate line GL4 and the first gate electrode GE1 are disposed on the first substrate 301.

At least one of the fourth gate line GL4 and the first gate electrode GE1 may include or be formed of one of: aluminum (Al) or alloys thereof, silver (Ag) or alloys thereof, copper (Cu) or alloys thereof, and/or molybdenum (Mo) or alloys thereof. Alternatively, at least one of the fourth gate line GL4 and the first gate electrode GE1 may include or be formed of one of: chromium (Cr), tantalum (Ta), and/or titanium (Ti). In an embodiment, at least one of the fourth gate line GL4 and the first gate electrode GE1 may have a multilayer structure including at least two conductive layers that have different physical properties.

The gate insulating layer 311 is disposed on the fourth gate line GL4 and the first gate electrode GE1. In one embodiment, the gate insulating layer 311 is disposed over the entire surface of the first substrate 301 including the fourth gate line GL4 and the first gate electrode GE1.

The gate insulating layer 311 may include silicon nitride ($SiN_x$), silicon oxide ($SiO_x$), or the like. The gate insulating layer 311 may have a multilayer structure including at least two insulating layers having different physical properties.

The fourth data line DL4, the fourth common line CL4, and a semiconductor layer 344 are disposed on the gate insulating layer 311. Although not illustrated, an end portion of the fourth data line DL4 may be connected to another layer or an external driving circuit. The end portion of the fourth data line DL4 may have an area larger than an area of another portion of the fourth data line DL4.

In order to secure a maximum transmittance of the display device, as illustrated in FIG. 29, a middle portion of the fourth data line DL4 may have a V-like bent shape. In addition, middle portions of the first pixel electrode PE1 and the fourth common line CL4 may have a V-like bent shape.

The fourth data line DL4 may include or be formed of a refractory material, such as molybdenum, chromium, tantalum, titanium, and/or an alloy thereof. The data line DL may have a multilayer structure including a refractory layer and a low resistance conductive layer. Examples of the multilayer structure may include or be formed of: a double-layer structure including a chromium or molybdenum (alloy) lower layer and an aluminum (alloy) upper layer; and a triple-layer structure including a molybdenum (alloy) lower layer, an aluminum (alloy) intermediate layer, and a molybdenum (alloy) upper layer. In an alternative embodiment, the fourth data line DL4 may include or be formed of any suitable metals and/or conductors rather than the aforementioned materials.

The fourth common line CL4 may include a material substantially the same as a material included in the fourth data line DL4 described above.

The semiconductor layer 344 overlaps at least a part of the first gate electrode GE1.

The semiconductor layer 344 may include amorphous silicon, polycrystalline silicon, or the like.

A first ohmic contact layer 321a and a second ohmic contact layer 321b are disposed on the semiconductor layer 344. The first ohmic contact layer 321a and the second ohmic contact layer 321b face each other with a channel area of the first switching element TFT1 interposed therebetween.

At least one of the first ohmic contact layer 321a and the second ohmic contact layer 321b may include or be formed of silicide or n+ hydrogenated amorphous silicon doped with n-type impurities, e.g., phosphorus (P) or hydrogen fluoride ($PH_3$), at high concentration.

The first source electrode SE1 is disposed on the first ohmic contact layer 321a. In an embodiment, although not illustrated, the first source electrode SE1 may also be disposed on the gate insulating layer 311. At least a portion of the first source electrode SE1 overlaps the semiconductor layer 344 and the first gate electrode GE1. The first source electrode SE1 and the aforementioned fourth data line DL4 may include a substantially same material and have a substantially same structure (multilayer structure). The first source electrode SE1 and the fourth data line DL4 may be formed substantially simultaneously in a substantially same process.

The first drain electrode DE1 is disposed on the second ohmic contact layer 321b and the gate insulating layer 311. At least a portion of the first drain electrode DE1 overlaps the semiconductor layer 344 and the first gate electrode GE1. The first drain electrode DE1 is connected to the first pixel electrode PE1. The first drain electrode DE1 and the fourth data line DL4 may include a substantially same material and have a substantially same structure (multilayer structure). The first drain electrode DE1 and the fourth data line DL4 may be formed substantially simultaneously in a substantially same process.

The first protective layer 321 is disposed on the fourth data line DL4, the first source electrode SE1, and the first drain electrode DE1. In one embodiment, the first protective layer 321 is disposed over the entire surface of the first substrate 301 including the fourth data line DL4, the first source electrode SE1, and the first drain electrode DE1. The first protective layer 321 has the first drain contact hole 901 and a common contact hole 904. The first drain contact hole 901 is located above the first connection portion 651, and the common contact hole 904 is located above the fourth common line CL4.

The first protective layer 321 may include or be formed of an inorganic insulating material, e.g., silicon nitride ($SiN_x$) or silicon oxide ($SiO_x$). In one embodiment, an inorganic insulating material having photosensitivity and a dielectric constant of about 4.0 may be used. The first protective layer 321 may have a double-layer structure including a lower inorganic layer and an upper organic layer. The first protective layer 321 may have a thickness larger than or substantially equal to about 5000 Å, e.g., in a range from about 6000 Å to about 8000 Å.

The insulating interlayer 352 is disposed on the first protective layer 321. The insulating interlayer 352 has the first drain contact hole 901 and the common contact hole 904. The first drain contact hole 901 is located above the first connection portion 651, and the common contact hole 904 is located above the fourth common line CL4.

The insulating interlayer 352 may include an organic layer having a low dielectric constant. For example, the insulating interlayer 352 may include or be formed of a photosensitive organic layer having a lower dielectric constant than that of the first protective layer 321.

The common electrode 330 is disposed on the insulating interlayer 352. The common electrode 330 is connected to the fourth common line CL4 through the common contact hole 904.

The common electrode 330 may include a transparent metal layer including, for example, indium zinc oxide ("IZO") or indium tin oxide ("ITO").

The second protective layer 322 is disposed on the common electrode 330, the insulating interlayer 352, the first protective layer 321, and the first drain electrode DE1.

The second protective layer 322 may include a material substantially the same as the material included in the first protective layer 321 described above.

The first pixel electrode PE1 and the first connection electrode 771 are disposed on the second protective layer 322. The first pixel electrode PE1 is connected to the first drain electrode DE1. Specifically, the first pixel electrode PE1 is connected to the first drain electrode DE1 through the first connection electrode 771 and the first drain contact hole 901.

The first pixel electrode PE1 may include a transparent metal layer including, for example, IZO or ITO described above. When the first pixel electrode PE1 includes IZO, the common electrode 330 may include ITO.

The light blocking layer 376 is disposed on the second substrate 302. The light blocking layer 376 may be disposed corresponding to the area of each gate line, each data line, each common line, and each switching element. The light blocking layer 376 has an opening defining a pixel area.

Although not illustrated, the light blocking layer 376 may be disposed on the first substrate 301 rather than the second substrate 302. In such an embodiment, the light blocking layer 376 may be disposed on the second protective layer 322. In such an embodiment, the light blocking layer 376 may be disposed corresponding to the area of each gate line, each data line, each common line, and each switching element as well.

The color filter 354 is disposed on the second substrate 302. In such an embodiment, the color filter 354 is disposed at a part of the opening of the light blocking layer 376 corresponding to the pixel area. An edge of the color filter 354 may be disposed on the light blocking layer 376.

An overcoat layer 722 is disposed on the light blocking layer 376 and the color filter 354. The overcoat layer 722 may be disposed over the entire surface of the second substrate 302 including the light blocking layer 376. The overcoat layer 722 serves to substantially minimize a height difference between constituent elements disposed between the overcoat layer 722 and the second substrate 302, e.g., constituent elements of the second substrate 302, such as the light blocking layer 376 and the color filter 354. In some embodiments, the overcoat layer 722 may be omitted in the display device.

The liquid crystal layer 333 is disposed between the first substrate 301 and the second substrate 302. The liquid crystal layer 333 may include liquid crystal molecules having negative dielectric anisotropy and vertically aligned. Alternatively, the liquid crystal layer 333 may include a photopolymerizable material, wherein the photopolymerizable material may be a reactive monomer or a reactive mesogen.

The second pixel includes a second switching element TFT2 and a second pixel electrode PE2, as illustrated in FIG. 29.

The second switching element TFT2 is disposed in an area (switching element area) surrounded by the fourth gate line GL4, the fifth gate line GL5, the third common line CL3, and the fourth data line DL4. The second switching element TFT2 may be a thin film transistor.

The second switching element TFT2 includes a second gate electrode GE2, a second source electrode SE2, and a second drain electrode DE2. The second gate electrode GE2 is connected to the fifth gate line GL5, the second source electrode SE2 is connected to the fourth data line DL4, and the second drain electrode DE2 is connected to the second pixel electrode PE2.

The second gate electrode GE2 and the fifth gate line GL5 may be integrally formed into a unitary structure. The second gate electrode GE2 may have a shape protruding from the fifth gate line GL5 toward the fourth gate line GL4.

An end portion of the fifth gate line GL5 may be connected to another layer or an external driving circuit. The end portion of the fifth gate line GL5 may have an area larger than an area of another portion of the fifth gate line GL5.

The second source electrode SE2 and the fourth data line DL4 may be integrally formed into a unitary structure. The second source electrode SE2 may have a shape protruding from the fourth data line DL4 toward the second gate electrode GE2.

The second pixel electrode PE2 is disposed in an area (pixel electrode area) surrounded by the fifth gate line GL5, the sixth gate line GL6, the third common line CL3, and the fourth data line DL4.

The second pixel electrode PE2 may include a plurality of branch electrodes 450 spaced apart from each other, as illustrated in FIG. 29. One side of each branch electrode 450 is connected to a second connection electrode 772. Each branch electrode 450 overlaps gate lines adjacent thereto. For example, an end of each branch electrode 450 of the second pixel electrode PE2 overlaps the fifth gate line GL5 and the sixth gate line GL6. A storage capacitor is formed at an overlap portion between each branch electrode 450 and the gate lines GL5 and GL6.

The second pixel electrode PE2 is connected to the second switching element TFT2. Specifically, the second pixel electrode PE2 is connected to the second drain electrode DE2 of the second switching element TFT2. The second pixel electrode PE2 and the second drain electrode DE2 may be connected to each other by the second connection electrode 772. The second connection electrode 772 extends from the second pixel electrode PE2 to an area above the second drain electrode DE2. As illustrated in FIG. 29, the second connection electrode 772 and the second pixel electrode PE2 are integrally formed into a unitary structure. The second connection electrode 772 may correspond to a part of the second pixel electrode PE2.

The second connection electrode 772 overlaps at least a portion of the fifth gate line GL5.

A connection portion between the second pixel electrode PE2 and the second drain electrode DE2 of the second switching element TFT2 is defined as a second connection portion 652. The second connection portion 652 refers to a contact interface between the second drain electrode DE2 and the second pixel electrode PE2, as illustrated in FIG. 29. The second pixel electrode PE2 may physically contact the second drain electrode DE2 through a second drain contact hole 902 that penetrates through the first protective layer 321, the insulating interlayer 352, and the second protective layer 322.

The second connection portion 652 is disposed closer to the fourth data line DL4 than the second gate electrode GE2. For example, a distance from the fourth data line DL4 to the second connection portion 652 is less than a distance from the fourth data line DL4 to the second gate electrode GE2. In such an embodiment, each distance corresponds to the length of a segment included in an imaginary straight line passing through all of the fourth data line DL4, the second connection portion 652, and the second gate electrode GE2.

The second connection portion 652 may be disposed between the fourth data line DL4 and the second gate electrode GE2, as illustrated in FIG. 29. More specifically, the second connection portion 652 may be disposed in an area surrounded by the fourth data line DL4, the second gate electrode GE2, the fifth gate line GL5, and the second source electrode SE2.

The position of the second drain contact hole 902 may be substantially the same as the position of the second connection portion 652 described above.

In an embodiment, each gate line and each gate electrode include a material substantially the same as a material included in the first gate electrode GE1 described above. Each source electrode, each drain electrode, each data line, and each common line may include a material substantially the same as a material included in the first source electrode SE1 described above. Each pixel electrode and each connection electrode may include a material substantially the same as a material included in the first pixel electrode PE1 described above.

Although not illustrated, the display device according to an embodiment of the present disclosure may further include a first polarizer and a second polarizer. When a surface of the first substrate 301 and a surface of the second substrate 302 that face each other are defined as upper surfaces of the corresponding substrates, respectively, and surfaces opposite to the upper surfaces are defined as lower surfaces of the corresponding substrates, respectively, the first polarizer is disposed on the lower surface of the first substrate 301, and the second polarizer is disposed on the lower surface of the second substrate 302.

A transmission axis of the first polarizer and a transmission axis of the second polarizer may be orthogonal to each other, and one of the transmission axes is arranged parallel to the gate lines GL. In an exemplary embodiment, the display device may include only one of the first polarizer and the second polarizer.

Although not illustrated, the display device according to an embodiment of the present disclosure may further include a light blocking electrode. The light blocking electrode may be disposed on the second protective layer 322 and overlap each data line DL (e.g., the fifth data line DL5). The light blocking electrode may be disposed along the data lines DL. The light blocking electrode may include a material substantially the same as a material included in the first pixel electrode PE1.

The light blocking electrode receives the aforementioned common voltage. The light blocking electrode substantially prevents an electric field from being generated between the data line DL (e.g., the fifth data line DL5) and the pixel electrode PE (e.g., the first pixel electrode PE1) of the corresponding pixel. In addition, since the light blocking electrode and the common electrode 330 that receive a substantially same common voltage become equipotential, a light having passed through the liquid crystal layer 333 between the light blocking electrode and the common electrode 330 is blocked by the second polarizer. Accordingly, light leakage may be substantially prevented at a portion corresponding to the data line DL. In addition, since the light blocking electrode may replace a portion of the light blocking layer 376 on the data line DL, the portion of the light blocking layer 376 on each data line DL may be removed when the light blocking electrode is used. Accordingly, when the light blocking electrode is used, an aperture ratio of the pixel may further increase.

As described above, the data lines DL and the common lines CL may be disposed on a substantially same layer. For example, the data lines DL and the common lines CL may be disposed on the gate insulating layer 311.

The data lines DL and the common lines CL may be alternately arranged along the first direction DR1.

Defect inspections for common lines CL may be performed with defect inspections for the data lines DL. That is, the common lines CL and the data lines DL may be inspected together in the inspection method described above. To this end, inspection lines IL connected to the common lines CL may further be disposed in the non-display area AR2 of the display device. The data lines DL and the common lines CL that are adjacent to each other may be grouped (or paired) as described above.

Even when a considerably large number of data lines DL1 to DLj and common lines CL1 to CLj−1 are arranged as of FIG. 28, the large number of data lines DL1 to DLj and common lines CL1 to CLj-1 may be easily inspected using the inspection line structure illustrated in one of FIGS. 3, 24 and 25 because the intervals between adjacent exposed inspection lines are sufficiently spaced apart, avoiding an inspection error of contacting two or more inspection lines at a time during an inspection process.

In an embodiment, the first protective layer 321, the insulating interlayer 352, the second protective layer 322, the common electrode 330, the second substrate 302, the light blocking layer 376, and the color filter 354 may be disposed on the first inspection line IL1, the second inspection line IL2, and the gate insulating layer 311 that are illustrated in FIGS. 4, 5, and 6.

In such an embodiment, the first protective layer 321, the insulating interlayer 352, the second protective layer 322, the common electrode 330, the second substrate 302, the light blocking layer 376, and the color filter 354 disposed on the first inspection line IL1, the second inspection line IL2, and the gate insulating layer 311 of FIGS. 4, 5, and 6 may overlap the entirety of the first inspection line IL1 and the entirety of the second inspection line IL2.

The structure of the inspection lines IL according to an embodiment of the present disclosure may be applied not only to the data lines DL1 to DLj, the sustaining lines VL, and the common lines CL1 to CLj-1, but also to the gate lines GL1 to GLi.

In addition, the structure of the inspection lines IL according to an embodiment of the present disclosure may be applied not only to liquid crystal display ("LCD") devices but also to other kinds of display devices such as organic light emitting diode ("OLED") display devices.

As set forth hereinabove, according to one or more embodiments of the present disclosure, the display device and the method of inspecting signal lines of the display device provide the following effects.

According to one or more embodiments of the present disclosure, inspection lines in a same inspection area are disposed on different layers with respect to an insulating layer interposed therebetween. Accordingly, the interval between exposed inspection lines in a same inspection area may be effectively increased. Thus, even if the number of data lines is large, the interval between adjacent inspection lines connected to the data lines may be sufficiently widened to facilitate a defect inspection on a large number of data lines.

While the present disclosure has been illustrated and described with reference to the embodiments thereof, it will be apparent to those of ordinary skill in the art that various changes in form and detail may be made thereto without departing from the spirit and scope of the present disclosure.

What is claimed is:

1. A display device comprising:
   a substrate;
   a first signal line disposed in a display area of the substrate; and
   a first inspection line disposed in a non-display area of the substrate and connected to the first signal line,
   wherein the first inspection line comprises:
      a first line disposed on a first layer and connected to the first signal line;
      a second line disposed on the first layer and spaced apart from the first line; and
      a third line disposed on a second layer different from the first layer on which the first line and the second line are disposed with an insulating layer interposed therebetween, the third line overlapping at least a portion of the first line and a portion of the second line, and
   wherein the first and second lines are not in contact with the third line.

2. The display device of claim 1, wherein one side edge of the substrate faces an end of the second line.

3. The display device of claim 1, wherein the third line is connected to the first line through a first contact hole of the insulating layer.

4. The display device of claim 1, wherein the third line is connected to the second line through a second contact hole of the insulating layer.

5. The display device of claim 1, wherein the third line is surrounded by the insulating layer.

6. The display device of claim 1, wherein the third line comprises:
   a first pad portion overlapping the first line;
   a second pad portion overlapping the second line; and
   a line portion disposed between the first pad portion and the second pad portion without overlapping the first line and the second line.

7. The display device of claim 6, wherein each of the first pad portion and the second pad portion has a width larger than a width of the line portion of the third line.

8. The display device of claim 1, wherein the first line comprises:
   a line portion connected to the first signal line; and
   a pad portion connected to the line portion of the first line and overlapping at least a portion of the third line.

9. The display device of claim 8, wherein the pad portion of the first line has a width larger than a width of the line portion of the first line.

10. The display device of claim 8, wherein the second line comprises:
    a pad portion facing the pad portion of the first line and overlapping at least a portion of the third line; and
    a line portion connected to the pad portion of the second line.

11. The display device of claim 10, wherein the pad portion of the second line has a width larger than a width of the line portion of the second line.

12. The display device of claim 1, further comprising:
    a second signal line disposed in the display area adjacently to the first signal line; and
    a second inspection line connected to the second signal line and disposed in the non-display area adjacently to the first inspection line.

13. A display device comprising:
    a substrate;
    a first signal line disposed in a display area of the substrate;
    a first inspection line disposed in a non-display area of the substrate and connected to the first signal line,
    a second signal line disposed in the display area adjacently to the first signal line; and
    a second inspection line connected to the second signal line and disposed in the non-display area adjacently to the first inspection line;
    wherein the first inspection line comprises:
       a first line disposed on a fist layer and connected to the first signal line;
       a second line disposed on the first layer and spaced apart from the first line; and
       a third line disposed on a second layer different from the first layer on which the first line and the second line are disposed with an insulating layer interposed therebetween, the third line overlapping at least a portion of the first line and a portion of the second line, wherein one side edge of the substrate faces an end of the second line and an end of the second inspection line, and wherein a first distance between the end of the second line and the one side edge is different from a second distance between the end of the second inspection line and the one side edge.

14. The display device of claim 13, wherein the second distance is longer than the first distance.

15. A display device comprising:
a substrate comprising a display area in which pixels are disposed, a non-display area disposed adjacent to the display area, and first to n-th inspection areas (n being a natural number larger than 1) arranged in the non-display area along a first direction; and
first to n-th inspection lines disposed in the non-display area and extending along a second direction, the first to n-th inspection lines connected to first to n-th signal lines of the display area, respectively,
wherein the first inspection line extends toward an edge of the substrate and overlaps the first to n-th inspection areas,
a p-th inspection line (p being a natural number larger than 1 and less than or equal to n) extends toward the edge of the substrate and overlaps the first to (n−p+1)-th inspection areas, and
two inspection lines among the first to n-th inspection lines that are adjacent to each other in a q-th inspection area (q being a natural number less than n) are disposed on different layers from each other with respect to an insulating layer interposed therebetween.

16. The display device of claim 15, wherein an (n−q)-th inspection line and an (n−q+1)-th inspection line in the q-th inspection area are disposed on different layers from each other with respect to the insulating layer.

17. The display device of claim 16, wherein the first to (n−q)-th inspection lines in the q-th inspection area are disposed on a substantially same layer with respect to the insulating layer.

18. The display device of claim 15, wherein the q-th inspection area comprises an area between a lowermost pad portion of the (n−q+1)-th inspection line and a lowermost pad portion of the (n−q)-th inspection line.

19. The display device of claim 15, wherein the q-th inspection area comprises an area between two imaginary parallel lines that pass through facing surfaces of a lowermost pad portion of the (n−q+1)-th inspection line and a lowermost pad portion of the (n−q)-th inspection line, respectively.

20. The display device of claim 15, wherein the n-th inspection area comprises an area between a lowermost pad portion of the first inspection line and the edge of the substrate.

21. The display device of claim 15, wherein distances between the edge of the substrate and respective first to n-th ends of the first to n-th inspection lines are different from each other.

22. The display device of claim 21, wherein a distance between the edge of the substrate and an end of the p-th inspection line is longer than a distance between the edge of the substrate and an end of the (p−1)-th inspection line.

23. The display device of claim 15, wherein the first inspection line comprises:

a first line disposed on a layer substantially the same as a layer on which the n-th inspection line is disposed, the first line connected to the first signal line;
a second line disposed on a layer substantially the same as the layer on which the n-th inspection line is disposed, the second line spaced apart from the first line; and
a third line disposed on a layer different from the layer on which the n-th inspection line is disposed with an insulating layer interposed therebetween, the third line overlapping at least a portion of the first line and a portion of the second line.

24. The display device of claim 23, wherein the third line comprises:
a first pad portion overlapping the first line;
a second pad portion overlapping the second line; and
a line portion disposed between the first pad portion and the second pad portion without overlapping the first line and the second line.

25. A method of inspecting signal lines of a display device, the method comprising:
preparing the display device comprising:
a substrate comprising a display area in which pixels are disposed, a non-display area disposed adjacent to the display area, and first to n-th inspection areas (n being a natural number larger than 1) arranged in the non-display area and extending along a first direction; and
first to n-th inspection lines disposed in the non-display area and extending along a second direction intersecting the first direction, the first to n-th inspection lines connected to first to n-th signal lines of the display area, respectively,
the first inspection line extending toward an edge of the substrate and overlapping the first to n-th inspection areas,
a p-th inspection line (p being a natural number larger than 1 and less than or equal to n) extending toward the edge of the substrate and overlapping the first to (n−p+1)-th inspection areas, and
two inspection lines among the first to n-th inspection lines that are adjacent to each other in a q-th inspection area (q being a natural number less than n) being disposed on different layers from each other with respect to an insulating layer interposed therebetween;
sequentially applying inspection signals to exposed inspection lines in the q-th inspection area; and
sequentially applying inspection signals to exposed inspection lines in a (q+1)-th inspection area.

26. The method of claim 25, wherein sequentially applying the inspection signals to the exposed inspection lines in the q-th inspection area comprises:
disposing an inspection equipment for providing the inspection signal in the q-th inspection area; and
moving the inspection equipment along the second direction allowing an output terminal of the inspection equipment to sequentially contact the exposed inspection lines in the q-th inspection area.

27. The method of claim 25, wherein sequentially applying the inspection signals to the exposed inspection lines in the (q+1)-th inspection area comprises:
disposing an inspection equipment for providing the inspection signal in the (q+1)-th inspection area; and
moving the inspection equipment along the second direction allowing the output terminal of the inspection equipment to sequentially contact the exposed inspection lines in the (q+1)-th inspection area.

* * * * *